United States Patent
Vartakavi et al.

(10) Patent No.: US 11,941,816 B2
(45) Date of Patent: Mar. 26, 2024

(54) AUTOMATED CROPPING OF IMAGES USING A MACHINE LEARNING PREDICTOR

(71) Applicant: Gracenote, Inc., Emeryville, CA (US)

(72) Inventors: Aneesh Vartakavi, Emeryville, CA (US); Casper Lützhøft Christensen, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 513 days.

(21) Appl. No.: 17/360,435

(22) Filed: Jun. 28, 2021

(65) Prior Publication Data

US 2021/0327071 A1 Oct. 21, 2021

Related U.S. Application Data

(63) Continuation-in-part of application No. 16/749,702, filed on Jan. 22, 2020, now Pat. No. 11,080,549.

(51) Int. Cl.
*G06T 7/11* (2017.01)
*G06N 3/08* (2023.01)
(Continued)

(52) U.S. Cl.
CPC .................. *G06T 7/11* (2017.01); *G06N 3/08* (2013.01); *G06T 7/174* (2017.01); *G06V 10/25* (2022.01);
(Continued)

(58) Field of Classification Search
CPC . G06T 7/11; G06T 7/174; G06T 2207/20081; G06T 2207/20084;
(Continued)

(56) References Cited

U.S. PATENT DOCUMENTS 9,514,536 B2  6/2016  Rafati et al.
9,594,984 B2  3/2017  Yu et al.
(Continued)

FOREIGN PATENT DOCUMENTS

KR  1020180130925 A  12/2018
WO  WO2017155660 A1  9/2017
WO  WO2017201540 A1  11/2017

OTHER PUBLICATIONS

Search Report and Written Opinion for PCT/US2020/057322 dated Jan. 29, 2021.
(Continued)

*Primary Examiner* — Charlotte M Baker
(74) *Attorney, Agent, or Firm* — McDonnell Boehnen Hulbert & Berghoff LLP

(57) ABSTRACT

Example systems and methods may selection of video frames using a machine learning (ML) predictor program are disclosed. The ML predictor program may generate predicted cropping boundaries for any given input image. Training raw images associated with respective sets of training master images indicative of cropping characteristics for the training raw image may be input to the ML predictor, and the ML predictor program trained to predict cropping boundaries for raw image based on expected cropping boundaries associated training master images. At runtime, the trained ML predictor program may be applied to runtime raw images in order to generate respective sets of runtime cropping boundaries corresponding to different cropped versions of the runtime raw image. The runtime raw images may be stored with information indicative of the respective sets of runtime boundaries.

20 Claims, 13 Drawing Sheets

(51) Int. Cl.
*G06T 7/174* (2017.01)
*G06V 10/25* (2022.01)
*G06V 10/26* (2022.01)
*G06V 10/764* (2022.01)
*G06V 10/774* (2022.01)

(52) U.S. Cl.
CPC .......... *G06V 10/267* (2022.01); *G06V 10/764* (2022.01); *G06V 10/774* (2022.01); *G06T 2207/20081* (2013.01); *G06T 2207/20084* (2013.01); *G06T 2207/20132* (2013.01)

(58) Field of Classification Search
CPC ... G06T 2207/20132; G06T 3/00; G06N 3/08; G06N 3/045; G06N 3/084; G06V 10/25; G06V 10/267; G06V 10/764; G06V 10/774
USPC .......................................................... 382/190
See application file for complete search history.

(56) References Cited

U.S. PATENT DOCUMENTS

| | | |
|---|---|---|
| 2013/0259332 A1 | 10/2013 | McVey |
| 2014/0099034 A1 | 4/2014 | Rafati et al. |
| 2014/0270431 A1 | 9/2014 | Xu et al. |
| 2016/0104055 A1 | 4/2016 | Lin et al. |
| 2017/0039457 A1 | 2/2017 | Yu et al. |
| 2017/0330029 A1 | 11/2017 | Turcot et al. |
| 2018/0012110 A1 | 1/2018 | Souche et al. |
| 2019/0130232 A1 | 5/2019 | Kaasila et al. |
| 2020/0104594 A1* | 4/2020 | Zucker .................... H04W 4/35 |

OTHER PUBLICATIONS

Search Report and Written Opinion for PCT/US2020/057303 dated Feb. 15, 2021.

* cited by examiner

*Early Training: Confidence < 0.5*

*Late Training: Confidence ~ 0.9*

AUTOMATED CROPPING OF IMAGES USING A MACHINE LEARNING PREDICTOR

CROSS-REFERENCE TO RELATED APPLICATIONS

This application is a continuation of and claims priority to U.S. patent application Ser. No. 16/749,702, filed Jan. 22, 2020, which is incorporated herein by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method may include inputting to a machine learning (ML) predictor program implemented on a computing device a first plurality of training raw images, each respective training raw image of the first plurality being associated with a respective set of training master images, each training master image of a given respective set of training master images indicating respective cropping characteristics defined for the associated respective training raw image, wherein the ML predictor program is configured to generate predicted cropping characteristics for any given input image, and wherein cropping characteristics for any particular input image comprise coordinates of cropping boundaries with respect to the particular input image prior to cropping; training the ML predictor program to predict cropping characteristics for each respective training raw image based on expected cropping characteristics represented in the associated respective set of training master images; subsequent to training the ML predictor program with the first plurality of training raw images, applying the trained ML predictor program to a second plurality of runtime raw images in order to generate for each respective runtime raw image of the second plurality a respective set of runtime cropping characteristics, wherein the respective set of runtime cropping characteristics for each respective runtime raw image comprises one or more subsets of cropping coordinates for the respective runtime raw image, and wherein each subset corresponds to a different cropped version of the respective runtime raw image; and storing, in non-transitory computer-readable memory, the second plurality of runtime raw images together with the respective set of runtime cropping characteristics for each respective runtime raw image of the second plurality.

In another aspect, may include a system including one or more processors, and memory storing instructions that, when executed by the one or more processors, cause the system to carry out operations of a machine learning (ML) predictor program. The operations may include receiving as input to the ML predictor program a first plurality of training raw images, each respective training raw image of the first plurality being associated with a respective set of training master images, each training master image of a given respective set of training master images indicating respective cropping characteristics defined for the associated respective training raw image, wherein the ML predictor program is configured to generate predicted cropping characteristics for any given input image, and wherein cropping characteristics for any particular input image comprise coordinates of cropping boundaries with respect to the particular input image prior to cropping; training the ML predictor program to predict cropping characteristics for each respective training raw image based on expected cropping characteristics represented in the associated respective set of training master images; subsequent to training the ML predictor program with the first plurality of training raw images, applying the trained ML predictor program to a second plurality of runtime raw images input to the trained the ML predictor program in order to generate for each respective runtime raw image of the second plurality a respective set of runtime cropping characteristics, wherein the respective set of runtime cropping characteristics for each respective runtime raw image comprises one or more subsets of cropping coordinates for the respective runtime raw image, and wherein each subset corresponds to a different cropped version of the respective runtime raw image; and storing, in non-transitory computer-readable memory, the second plurality of runtime raw images together with the respective set of runtime cropping characteristics for each respective runtime raw image of the second plurality.

In still another aspect, non-transitory computer-readable medium may have instructions stored thereon that, when executed by one or more processors of a system, cause the system to carry out operations of a machine learning (ML) predictor program. The operations may include receiving as input to the ML predictor program a first plurality of training raw images, each respective training raw image of the first plurality being associated with a respective set of training master images, each training master image of a given respective set of training master images indicating respective cropping characteristics defined for the associated respective training raw image, wherein the ML predictor program is configured to generate predicted cropping characteristics for any given input image, and wherein cropping characteristics for any particular input image comprise coordinates of cropping boundaries with respect to the particular input image prior to cropping; training the ML predictor program to predict cropping characteristics for each respective training raw image based on expected cropping characteristics represented in the associated respective set of training master images; subsequent to training the ML predictor program with the first plurality of training raw images, applying the trained ML predictor program to a second plurality of runtime raw images input to the trained the ML predictor program in order to generate for each respective runtime raw image of the second plurality a respective set of runtime cropping characteristics, wherein the respective set of runtime cropping characteristics for each respective runtime raw image comprises one or more subsets of cropping coordinates for the respective runtime raw image, and wherein each subset corresponds to a different cropped version of the respective runtime raw image; and storing, in non-transitory computer-readable memory, the second plurality of runtime raw images together with the respective set of runtime cropping characteristics for each respective runtime raw image of the second plurality.

DETAILED DESCRIPTION

I. Overview

Figure 1A:
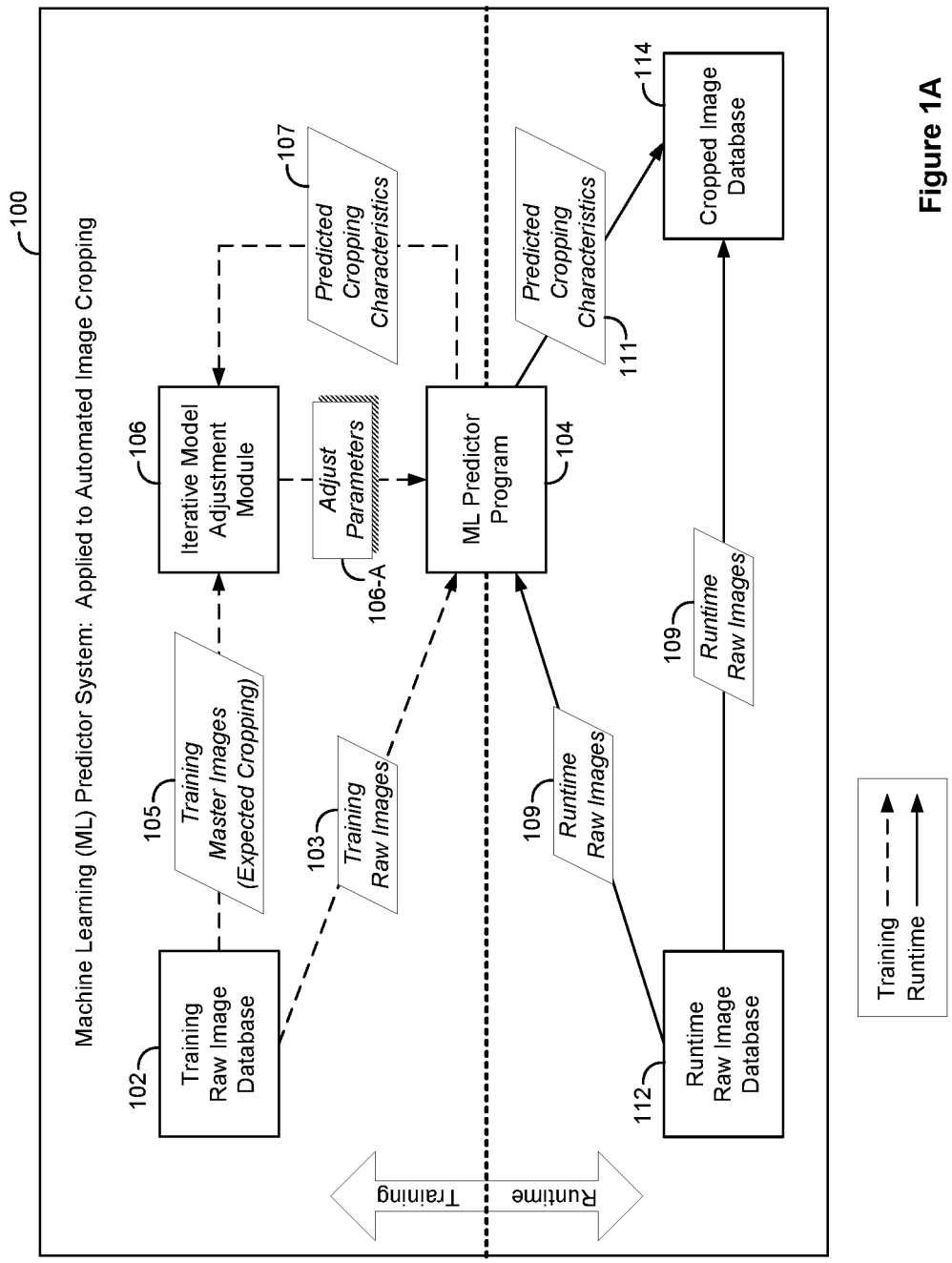
FIG. 1A is a simplified block diagram of an example ML predictor system in which various disclosed principles can be implemented.

Content providers may provide various forms of image-based content to end users, including video content and still image content. A content provider may be a direct source of content for end users, or may provide content to one or more content distribution services, such as broadcasters, which then deliver selected content to end users. Content may include digital and/or analog still images and/or video images. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users.

A content provider and/or content distribution service may be interested identifying certain visual features of delivered content to enable the identified features to be called out for attention or consideration to end users. Calling attention to visual features may be useful for content providers and/or content distribution services for promotional purposes, such as sponsor and/or product advertising, and program content promotion, and for example. Identification of particular visual features may also be part of value added services for end users, such as electronic program guides (EPGs) or other program control functions.

Of particular interest may be images of people associated with a content program, such as a TV program or packet network video streaming program. For example, there may be value in being able to provide various images of cast members of a TV or streaming media program. In an example embodiment, during broadcasting or streaming of a TV program, such as a sitcom or drama, an inset image of one or more of the cast members (e.g., actors) currently appearing in the broadcast stream may be displayed, together with some form of promotional text or audio. Other examples are possible as well, such as identification of crew or other personalities of a TV news program displayed in small side and/or inset images during a broadcast segment in which those personalities appear.

It may be desirable or necessary to have available more than one version of particular images. Different versions of a particular image may correspond to different cropping characteristics, where cropping characteristics may describe cropping boundaries, images sizes (e.g., pixel-array size), and/or regions of interest (ROIs) of a given image. For example, a particular image may have multiple sets of cropping characteristics defined, each set specifying a possibly different ROI, different cropping borders, and a different size. Each set may be applied to the same particular image so as to create a different version of cropped image.

Different cropped image versions may be useful for different applications. For example, a larger format image may be appropriate or desirable for advertising or promotion of the material represented in the original, uncropped image. On the other hand, a small format image may be appropriate for a small-screen application, such as an EPG. For two-dimensional (2D) or planar images, cropping borders or boundaries may be specified together with an aspect ratio instead of, or in addition to, image size.

Conventionally, creation or generation of cropped images of a given initial image may be largely (or entirely) a manual process. In an example of this conventional approach, each image to be cropped may be evaluated by a human who applies artistic and aesthetic judgement, possibly among other factors, in deciding where to place cropping borders. The placement of a given set of cropping borders may also define the aspect ratio, ROI, and size of the cropped version of the initial image. In some operations, one or more parameters of the cropping characteristics may be determined ahead of time, in which case the artistic or aesthetic judgement may be applied to the free parameters in order to arrive at the "best" cropping version or versions. For example, the aspect ratio may be fixed, but size and ROI may remain free parameters. In other cases, both size and aspect ratio may be fixed, while ROI remains a free parameter. Other combinations of fixed and free parameters of cropping characteristics may be used as well.

In typical applications, an initial image that is subject to cropping may be referred to as a "raw image" and each version of a cropped raw image may be referred to as a "master image." A given raw image may have a set of one or more master images, each master image being associated with different cropping characteristics (e.g., cropping borders, aspect ratios, ROIs, and image size). Master images may be defined in terms of parameters, which when applied to the associated raw image yields an actual image having the defined characteristics. As such, a master image may be implemented as "metadata" together with an associated raw image. However, it may also be possible to create and store a master image as an actual distinct image having the defined characteristics, in addition to or instead of metadata.

In practice, a content provider may maintain many thousands, tens of thousands, or more of raw images. Further, it may be desirable or necessary to create and store an associated set of master images for all or some of the raw images. For example, the content provider may supply content to a delivery service, such as a broadcaster or streaming service. The streaming service, which may deliver content to end-user subscribers, may want or need access to cropped images (e.g., master images) as part of an end-user service or application. In this arrangement, the content provider may therefore need to maintain both the raw images and the associated master (cropped) images. Other arrangements are possible as well. For example, the content provider may serve end-user subscribers directly, or may be a broadcaster or streaming service that has subsidiary or affiliate broadcast stations.

For any of these and other possible arrangements, manual cropping of large volumes of raw images may be a tedious, burdensome, and inefficient operation. Nevertheless, the artistic and aesthetic judgement that typically goes into the process may present challenges to the ability to automate the cropping process. In view at least of the need for, and challenges to, automated cropping, the inventors have recognized that machine learning techniques may be applied to uncropped images in order to create cropped versions having cropping characteristics that closely resemble or even match those derived manually and according to human artistic and aesthetic judgement. More specifically, the inventors have devised techniques for training various types of computational machine learning predictors ("ML predictors") to be able to recognize cropping characteristics from examples of cropped images, and to then apply the learned examples to raw images in an automated image-cropping process.

Further, the inventors have developed example systems, including various forms of computational ML predictors and associated algorithms implemented on one or more computing devices, that may be applied in runtime to raw images in order to automate cropping of large numbers of runtime raw images. The example systems may then store the raw images with respective sets of runtime master (cropped) images, and subsequently make them available to a variety of applications that use or need them. The runtime master images may be stored as metadata or other forms, described below. In addition to automating image cropping, the example systems and the example methods they carry out may also computationally determine statistical confidence levels of automated cropping results, enabling quantitative evaluation of cropping characteristics generated by the system. In some embodiments, determination of confidence levels may be considered integral to determination of cropping characteristics.

Accordingly, example embodiments are described herein of systems and methods for automated image cropping using a machine learning predictor program. In the discussion herein, the term "ML predictor" will be used as an abbreviation for "machine learning predictor." The ML predictor program may generate predicted cropping boundaries for any given input image. Training raw images associated with respective sets of training master images indicative of cropping characteristics for the training raw image may be input to the ML predictor, and the ML predictor program trained to predict cropping boundaries for raw image based on expected cropping boundaries associated training master images. At runtime, the trained ML predictor program may be applied to runtime raw images in order to generate respective sets of runtime cropping boundaries corresponding to different cropped versions of the runtime raw image.

The runtime raw images may be stored with information indicative of the respective sets of runtime boundaries. Runtime raw images and their associated predicted cropping characteristics may be reviewed in real time and/or at a later time either manually or in an automated operation in order to access one or more selected frames for purposes such as those described above.

In addition to application of an ML predictor program to automated image cropping, the inventors have further recognized that cropping characteristics deemed artistically and/or aesthetically desirable for purposes of raw images may similarly be applied to determining artistically and/or aesthetically desirability of video image frames. More specifically, a content provider may want to evaluate which frame or frames of a sequence of video frames best represents the content of the sequences. For example, the "best" video frame of a sequence might be one in which character is looking most directly toward the camera, or is most centered in the frame. Other criteria may be applied as well. Like the task of cropping raw images, selection of a "best" video frame has conventionally been a manual process for largely similar reasons. The inventors have recognized that the same or similar training techniques may be applied to an image-cropping classifier, which may then be applied at runtime to a sequence of video frames in order to identify a preferred frame.

The inventors have thus extended example systems and methods of automated ML predictor programs to selection of video frames from sequences of video frames. More particularly, a trained ML predictor program may be used to determine cropping characteristics for each frame of a video sequence. In addition, the cropping characteristics for each frame may be assigned a "score" corresponding to a statistical confidence level, or other likelihood metric, for example. The highest score from among a sequence of video frames may then be used to identify the "best" video frame of the sequence. As mentioned above, the statistical confidence associated with a given set of cropping characteristics may be determined as part of, or ancillary to, the operations that generate the cropping characteristics Other criteria may be used in assigning scores, or identifying the "best" frame.

Further, application of an automated ML predictor to video frame selection may be carried out on a video sequence as a pre-processing operation or a post-processing operation. More particularly, a video frame sequence may contain subject content that varies across frames in a manner such that some frames are less relevant to content of interest than others. For example, if content of interest is associated with characters in a movie (e.g., characters played by actors), then frames that don't contain characters or in which characters appear as subordinate subject content may be excluded from consideration of automated selection. Applying an automated ML predictor to video frame selection in a pre-processing operation may use the automated selection to disqualify frames with less relevant subject content, in addition to selection of the "best" frame or frames. In a post-processing operation, an automated ML predictor may be applied to a sequence of video frame for which frames with less relevant subject content are removed prior to automated selection. Prior removal may be done by human evaluation (e.g., viewing a video sequence and editing out less relevant portions), or some other automated process.

Accordingly, example embodiments are additionally described herein of systems and methods for automated video frame selection using an ML predictor program. The ML predictor program may generate predicted cropping boundaries for any given input image. Training raw images associated with respective sets of training master images indicative of cropping characteristics for the training raw image may be input to the ML predictor, and the ML predictor program trained to predict cropping boundaries for raw image based on expected cropping boundaries associated training master images. At runtime, the trained ML predictor program may be applied to a sequence of video image frames to determine for each respective video image frame a respective score corresponding to a highest statistical confidence associated with one or more subsets of cropping boundaries predicted for the respective video image frame. Information indicative of the respective video image frame having the highest score may be stored or recorded. Scores may be reviewed in real time and/or at a later time either manually or in an automated operation in order to access one or more selected frames for purposes such as those described above.

Automating image cropping using a trained ML predictor program may advantageously enable the creation and storage of multiple version of high-quality cropped images of large volumes of raw images for purposes such those described above. Similarly, automating video frame selection using a trained ML predictor program may advantageously enable the identification of "best" (e.g., most representative of content) video frames from frame sequences, also for purposes such those described above. Details of example embodiments of methods and systems are described by way of example below.

II. Architecture

A. Example Automated Image Cropping System

FIG. 1A is a simplified block diagram of an example ML predictor system 100 that may be applied to automated image cropping. The ML predictor system 100 can include various components, which may be implemented as or in one or more computing devices. As such, components of the ML predictor system 100 may themselves be or include hardware, software, firmware, or combinations thereof. Non-limiting example components of the ML predictor system 100 include a training raw image database 102, an ML predictor program 104, an iterative model adjustment module 106, a runtime raw images database 112, and a cropped image database 114. In the illustration of FIG. 1A, data inputs and outputs, such as the runtime raw images database 112, and the cropped image database 114, are included as components of the system. In other representations, these might be considered separate from the system itself, and instead viewed as elements that supply data to the system 100 and/or consume data produced by the system 100.

The ML predictor system 100 can also include one or more connection mechanisms that connect various components within the ML predictor system 100. By way of example, the connection mechanisms are depicted as arrows between components. The direction of an arrow may indicate a direction of information flow, though this interpretation should not be viewed as limiting. As described below, the ML predictor system 100 may operate in a training mode and/or a runtime mode. For purposes of illustration, connection mechanisms that serve training operation are depicted with dashed lines, while connection mechanisms that serve runtime operation are depicted with solid lines.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

FIG. 1A also illustrates information flow that occurs on the various connections during operation. During training operation, training raw images 103 are input to the ML predictor program 104 from the training raw images database 102. The ML predictor program 104 outputs predicted cropping characteristics 107 to the iterative model adjustment module 106, which also receives training master images 105 from the training raw images database 102. The iterative model adjustment module 106 then acts adjust parameters of the ML predictor program 104, as represented by parameter adjustment information 106-A communicated to the ML predictor program 104.

During runtime operation, runtime raw images 109 are input to the ML predictor program 104 from the runtime raw images database 112. The ML predictor program 104 outputs predicted cropping characteristics 111 to the cropped image database 114, which also receives runtime raw images 109 from the runtime raw images database 112.

In both training and runtime operation, the information communicated between components may be in the form of structured data, such as images or data records, or may more general exchange of information across interfaces between components. Other types of information flow may be possible as well.

As noted, the ML predictor system 100 and/or components thereof can take the form of, be part of, or include or encompass, a computing system or computing device.

Figure 1B:
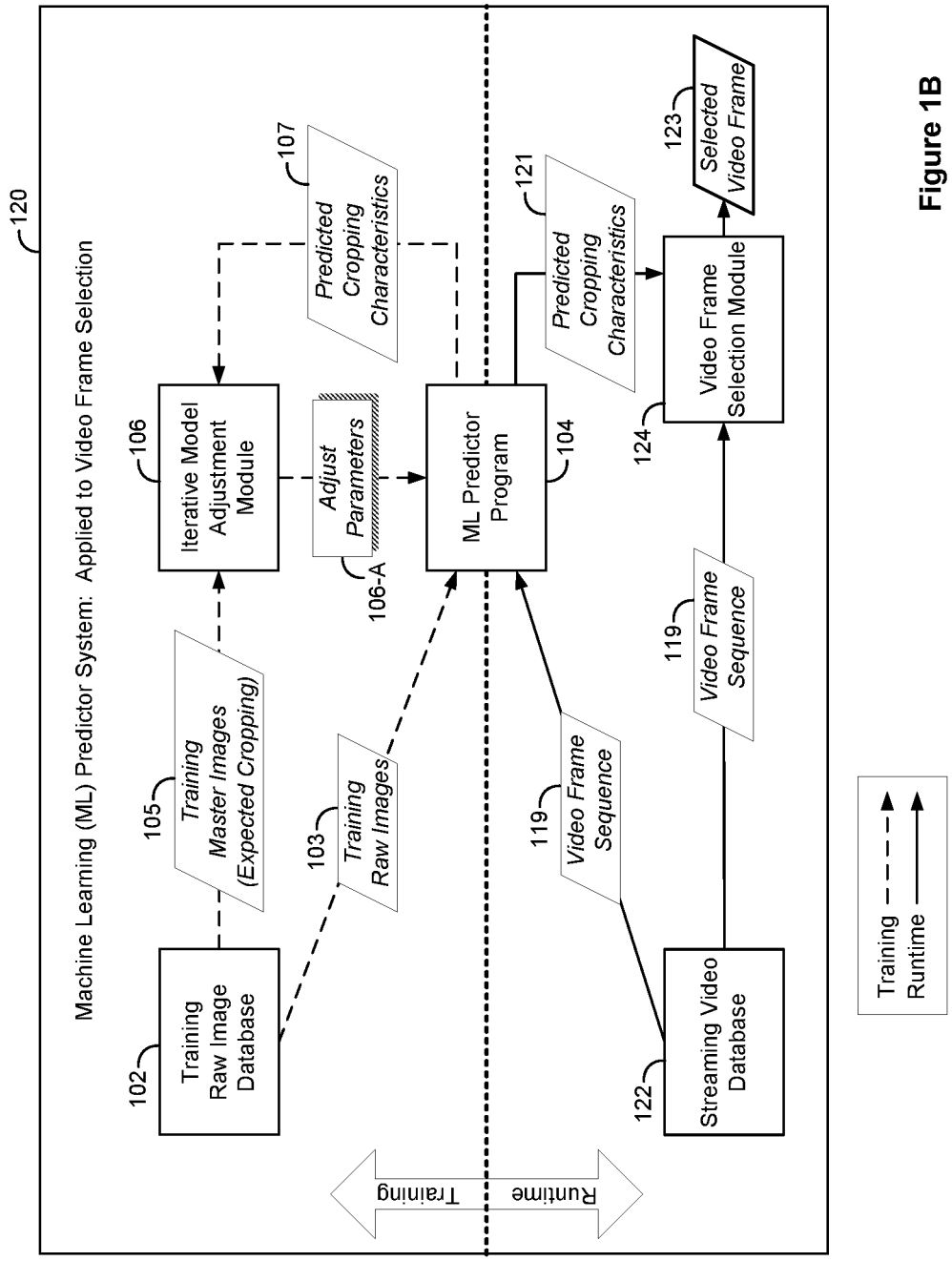
FIG. 1B is a simplified block diagram of another example ML predictor system in which various disclosed principles can be implemented

FIG. 1B is a simplified block diagram of another example embodiment of an ML predictor system 120 that may be applied to video frame selection. The ML predictor system 120 is similar in certain respects to the example ML predictor system 100 of FIG. 1A. As with the ML predictor system 100, components of the ML predictor system 120 may themselves be or include hardware, software, firmware, or combinations thereof. Non-limiting example components of the ML predictor system 100 include, again, a training raw image database 102, an ML predictor program 104, and an iterative model adjustment module 106. System 120 also includes a streaming video database 122 and a video frame selection module 124. In the illustration of FIG. 1B, data inputs and outputs, such as the streaming video database 122 are included as components of the system. In other representations, these might be considered separate from the system itself, and instead viewed as elements that supply data to the system 120 and/or consume data produced by the system 120.

The ML predictor system 120 can also include one or more connection mechanisms that connect various components within the ML predictor system 120. As with the ML predictor system 100, the ML predictor system 120 may operate in a training mode and/or a runtime mode. For purposes of illustration, connection mechanisms that serve training operation are depicted with dashed lines, while connection mechanisms that serve runtime operation are depicted with solid lines.

FIG. 1B also illustrates information flow that occurs on the various connections during operation. Training operation of ML predictor system 120 may be the same as, or substantially similar to, that of system 100. As such, the example information flow may be the same as that described above for system 100.

During runtime operation of system 120, a video frame sequence 119 is input to the ML predictor program 104 from the streaming video database 122. The ML predictor program 104 outputs predicted cropping characteristics 111 to the video frame selection module 124, which also receives the video frame sequence 119 from the streaming video database 122. The video frame selection module may then evaluate confidence levels of the predicted cropping characteristics of some or all of the video frames in order to select the "best" video from, represented by the output selected video frame 123.

As with the ML predictor system 100, the ML predictor system 120 and/or components thereof can take the form of, be part of, or include or encompass, a computing system or computing device.

Operation of ML predictor systems 100 and 120 in both training mode and runtime mode is described in more detail below.

In example embodiments, an ML predictor system, such as, but not limited to, systems 100 and 120, may be operated by a media content provider in order to add value to a media distributor that obtains media from the provider and distributes it to end users. Additionally or alternatively, a media distributor may operate an ML predictor system to add value to media content obtained from a media content provider. Other implementation and embodiments are possible. It should be understood that example operation described herein of example ML predictor systems is not intended to limit the contexts in which the example systems may be implemented and/or operated.

Example ML predictor systems 100 and 120 may be considered high-level descriptions in the sense, for example, that details of the ML predictor program 104 may not necessarily be readily apparent from FIGS. 1A and 1B. Further details of example embodiments are described below in the context of example operation, including example implementations of an ML predictor program.

B. Example Computing System

Figure 2:
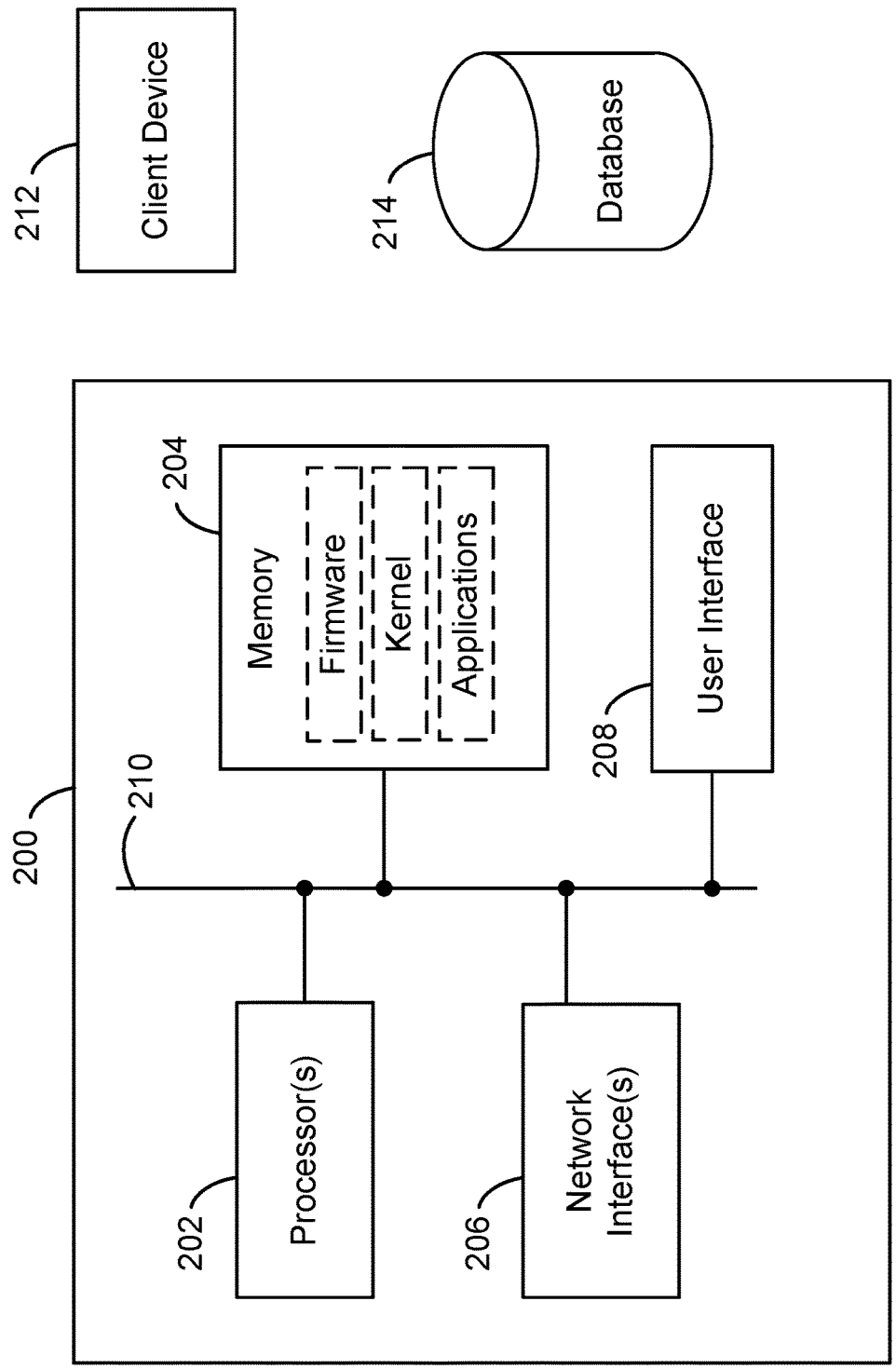
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, that may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such as the training raw image database 102, the runtime raw image database 112, the cropped image database 114, and/or streaming video database 122, referenced above and described in more detail below.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations

The example ML predictor systems 100 and 120 and/or components thereof, as well as other example embodiment described below, can be configured to perform and/or can perform one or more acts. Examples of these and related features, including further details of implementation, will now be described. Example operation will first be described for example ML predictor systems 100 and 120.

Generally, ML predictor systems described herein, including both of the ML predictor systems 100 and 120, may operate in two modes: training mode and runtime mode. In training mode, the ML predictor systems 100 and 120 may be "trained" to recognize examples of cropped images for which the cropping characteristics are predetermined to meet various criteria for quality, acceptability, or artistic and/or aesthetic desirability, for example. In runtime mode, the ML predictor systems 100 and 120 may operate to predict cropping characteristics of either runtime raw images in order to generate cropped versions (system 100), or of video frame sequences in order to select a "best" frame (system 120). Both systems may be implemented using a common ML predictor program, where the differences between the systems are largely the form of input data (raw images versus video sequences) and the purpose of the output (cropped images versus selected video frames). Given the common ML predictor program, training for both systems may be largely or entirely the same. Accordingly, the discussion below relating to training operation may be considered as applying to both ML predictor systems 100 and 120.

In addition to the ML predictor systems 100 and 120 shown in FIGS. 1A and 1B, particular example implementations of both types of system are described with additional detail in FIGS. 4A, 4B, 4C, 5A, and 5B. As discussed below, the particular implementations include artificial neural networks (ANNs) that function to extract features from input images (raw or video frames), predict cropping characteristics, and predict confidence levels of predicted cropping characteristics. Each of these particular implementations is described in terms of example operation described below.

As is known, an ANN may be computationally constructed as a plurality of interconnected layers, including an input layer, an output layer, and one or more intermediate layers. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, may involve inputting training data that represents known (training) examples of the particular class of content, and then adjusting parameters (or weights) of the nodes in a feedback-like procedure to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions below. Further, other types of ANNs are possible, and may be used or included in example embodiments of ML predictors described herein.

Subsequent to training, one or more "runtime" instances a given type of data may be input to a trained ANN classifier to determine a quantitative prediction or probability that the runtime data contains a particular class of content. In this sense, the ANN classifier is trained to recognize content that matches or is similar to the known examples of the particular class of content. Similarly, one or more runtime instances a given type of data may be input to a trained ANN regression program to determine an output value or values. In this sense, the ANN regression program is trained to compute (e.g., continuous-valued) results that match or are similar to the known examples of results for a particular class of content. For either case, the training examples of the particular class of content are referred to as "ground truth" or just "truth," and the output of an ANN is referred to as "predictions."

In the field of image recognition, a type of ANN called a convolutional neural network (CNN) is known to be effective. Image data in the form of pixel values, for example, may be input to the input layer of a CNN. Conceptually, the layers of a CNN evaluate different levels (e.g. hierarchical) of structure represented in the image data. This may be implemented mathematically by different learnable filters at each layer that are convolved with the inputs of the previous layer (hence, convolutional NN). Training may involve adjusting weights of the nodes, as well as parameters of the filters. This very simplified explanation is meant only to provide some context for the present, and should not be seen limiting with respect to example embodiments described herein. Further, while example embodiments described below include a CNN, this is not necessarily required of all possible implementations.

Before discussing example operation, it is useful to describe examples of image cropping, as well as to introduce some terminology. As mentioned above, an initial image that is subject to, or is an uncropped input to, a cropping operation is referred to as a "raw" image, and each of one or more cropped versions of a raw image is referred to as a "master image." This terminology may be applied to conventional cropping techniques (e.g., as performed by humans), or to automated cropping carried out in accordance with example embodiments. For example, as described below, training master images may include conventionally cropped versions (e.g., by human photo editors) of associated training raw images. This collection may thus form examples of raw images and associated cropping characteristics that are predetermined to meet various criteria for quality, acceptability, or artistic and/or aesthetic desirability, for example. As another example, at runtime, raw images that have not been subject to cropping may be input from a database of raw images to an ML predictor program, which then generates output master (cropped) images.

In accordance with example embodiments, and for purposes of the discussion herein, the term "cropping characteristics" is used to describe both the information that may be applied to a raw image (e.g., as criteria or constraints) in order to yield a cropped version (e.g., master) of the raw image. The term may also be used to describe cropping results yielded by a cropping operation. For example, predetermined cropping characteristics may serve as constraints or criteria for an automated cropping operation, and predicted cropping characteristics may correspond to predictions of an ANN-based ML predictor program. Non-limiting examples of cropping characteristics of a given cropped image include a bounding box or cropping box defined by planar coordinates of its vertices (e.g. corners of a rectangle), an aspect ratio, a size (e.g., pixel height and width), region of interest (e.g., pixel region of the raw image), and statistical confidence level of the one or more of the included forms of the other cropping characteristics. For some examples discussed herein, specific cropping characteristics are specified as constraints. In some examples, just cropping coordinates are specified; these may also be referred to as "crop points."

For any given raw image, there may be more than one suitable, desirable, or required cropping version (master image) defined, each according to a respective fixed aspect ratio or a fixed size and aspect ratio, for example. A given aspect ratio aspect ratio alone may be accommodated in multiple ways in a raw image in terms of size and location in the raw image. A given size and aspect ratio may be accommodated in multiple ways in a raw image in terms only of location in the raw image. In either case, the associated master image may be described by a bounding box specified, for example, by four cropping points (e.g., in pixel coordinates in the associated raw image) corresponding to corners of a rectangular box. With this arrangement, a bounding box describes a size, aspect ratio, and image region (which may be taken to be a ROI) in the associated raw image.

In the context of conventional image cropping or automated image cropping according to example embodiments, cropping a raw image entails determining cropping points in the raw image, given one or more sets of constraints. Non-limiting examples of constraints are fixed aspect ratio, and fixed aspect ratio and fixed size. Other types of constraints are possible as well. In conventional image cropping, a human photo editor may apply the constraints and visually judge the most appropriate cropping points. An ML predictor program, according to example embodiments, may learn how to automate application of constraints to raw images in order to automate this process. The learning process may be accomplished by training using examples from conventional cropping.

Figure 3:
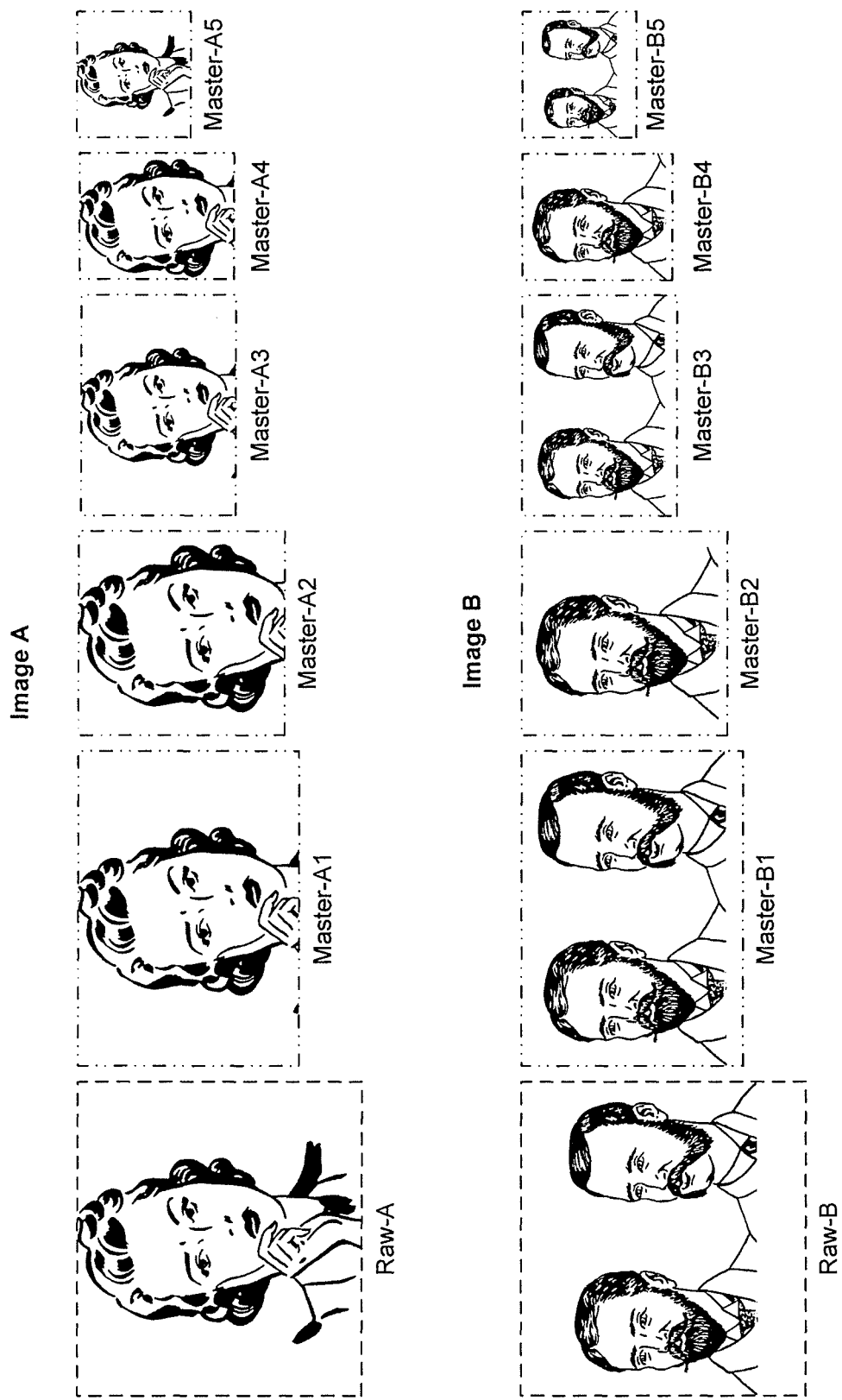
FIG. 3 illustrates two examples of raw images and associated master images, in accordance with example embodiments.

FIG. 3 illustrates two examples of raw images and associated master images, in accordance with example embodiments. Shown at the top of FIG. 3 is "Image A" of a woman's face. The raw image ("Raw-A") is shown at the left. Five cropped (master) images, labeled "Master A-1," "Master A-2," . . . "Master A-5" are shown to the right of the raw image. As shown by way of example, each master image has a different bounding box and a different image size.

At the bottom of FIG. 3 is "Image B" of a two men's faces. The raw image ("Raw-B") is shown at the left. Five cropped (master) images, labeled "Master B-1," "Master B-2," . . . "Master B-5" are shown to the right of the raw image. Again by way of example, each master image has a different bounding box and a different image size.

A. Example Training Operation

As mentioned above, training for both systems 100 and 120 may be the same, so a common description may suffice. As illustrated conceptually in both FIGS. 1A and 1B, training raw images 103 from a training raw image database 102 are input to the ML predictor program, which generates predicted cropping characteristics 107. Training master images 105, which may be considered ground truths, may be input to the iterative model adjustment module 106, which also receives the predicted cropping characteristics 107. Through an iterative process of comparing the predicted cropping characteristics 107 with the training master images 105, parameters of the ML predictor program may be adjusted (106-A) to bring the predicted cropping characteristics into as close as possible agreement with the ground truths.

In practice, the cropping iterative adjustment module 106 may not necessarily be a distinct module of the system, but rather may be representational of feedback-like process carried out during training. For example, training an ANN may entail adjusting weights of nodes using a back-propagation technique. As such, there may not be a separate or distinct module or program component that performs a comparison of predicted cropping characteristics with known cropping characteristics. Rather, the adjustment process may entail computational operations that are carried out during training and based on quantitative comparison of predicted and known cropping characteristics. For the purposes of discussion herein, however, it is at least conceptually convenient to represent parameter adjustment as an identified module or component. Explicit identification of an iterative adjustment module should not be taken as limiting with respect to example embodiments discussed herein or other possible embodiments not necessarily included in the discussion. This applies as well to the discussion below of training of an example ANN-based implementation illustrated in FIG. 4A.

In some example embodiments, training master images represent a set of fixed aspect ratios, as described above. As such, training may entail training an ML predictor to generate predicted bounding boxes of training raw images that closely match bounding boxes of training master images associated with the training raw images. A close match may be a predicted bounding box for a given training raw image closely overlaps the bounding box of a training master image for the given training raw image.

Figure 6:
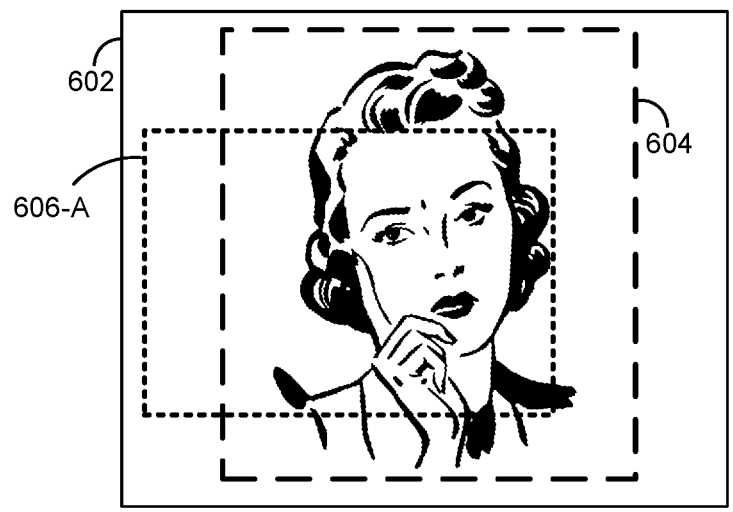
FIG. 6 is a conceptual illustration of confidence levels of image cropping, in accordance with example embodiments.
Figure 6:
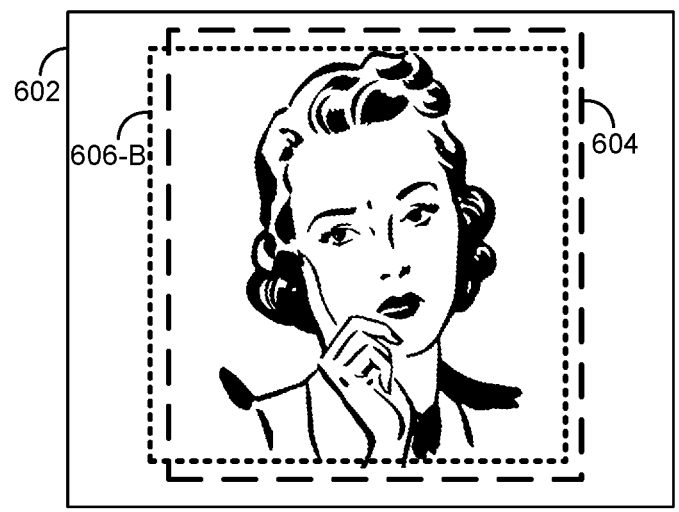

FIG. 6 illustrates two examples of comparing a predicted bounding box with a known bounding box for the same raw image. Both examples show the same raw image 602 and the same known (true) bounding box 604, but each shows a different predicted bounding box 606-A or 606-B. In both examples, the raw image 602 is depicted with a solid border, the known (true) bounding box 604 is depicted with dashed border, and the predicted bounding boxes 606-A and 606-B are depicted with dotted borders. The two examples may represent predictions made at different stages of training. The example at the top of FIG. 6 could represent a prediction made at an early training stage. As shown by way of example the predicted bounding box 606-A does not appear to be an accurate match to the true bounding box 604. The example at the bottom of FIG. 6 could represent a prediction made at a late training stage. The predicted bounding box 606-B in this case appears to be a fairly accurate match to the true bounding box 604.

During training, the accuracy of a match between a predicted bounding box and a known (true) bounding box may be quantitatively expressed as a confidence level. In accordance with example embodiments, a confidence level may take on a value between zero and one (i.e., [0,1]), where zero corresponds to the lowest (no) confidence, and one corresponds to the highest (complete) confidence. One way a confidence level can be determined during training is by measuring the overlap of a predicted bounding box with a true bounding box. Referring to FIG. 6, the overlap in the top example may be less than 50%, corresponding to a confidence level of less than 0.5. In contrast, the overlap in the bottom example may be approximately 90%, corresponding to a confidence level of approximately 0.9. These values are illustrative, and not necessarily computationally derived.

During runtime, as discussed below, there may not be known (true) bounding boxes (or other known cropping characteristics) available for comparing to predictions and computing confidence levels. However, in accordance with example embodiments, an ML predictor program may be trained to predict confidence levels of predicted bounding boxes (or other predicted cropping characteristics). Training for prediction of confidence levels is described below.

By training with training raw images that are associated with sets of fixed aspect ratios, corresponding to multiple, different cropped versions of at least some of the training raw images, an ML predictor program may learn to recognize multiple examples of aspect ratios that may be applied in cropping. Advantageously, then, the trained ML predictor program may at runtime be able to predict multiple cropping versions for at least some runtime raw images. Operationally, an ML predictor program may be trained separately for each choice of fixed aspect ratio, or may be trained using training data for two or more (possibly all) choices of fixed aspect ratio at once. In accordance with example embodiments, both approaches may be carried out and compared in order to determine if one yields better or more desirable results than the other. If so, the "better" approach may be adopted in practice. It will be appreciated that both approaches are possible and in accordance with example embodiments described herein.

Figure 4A:
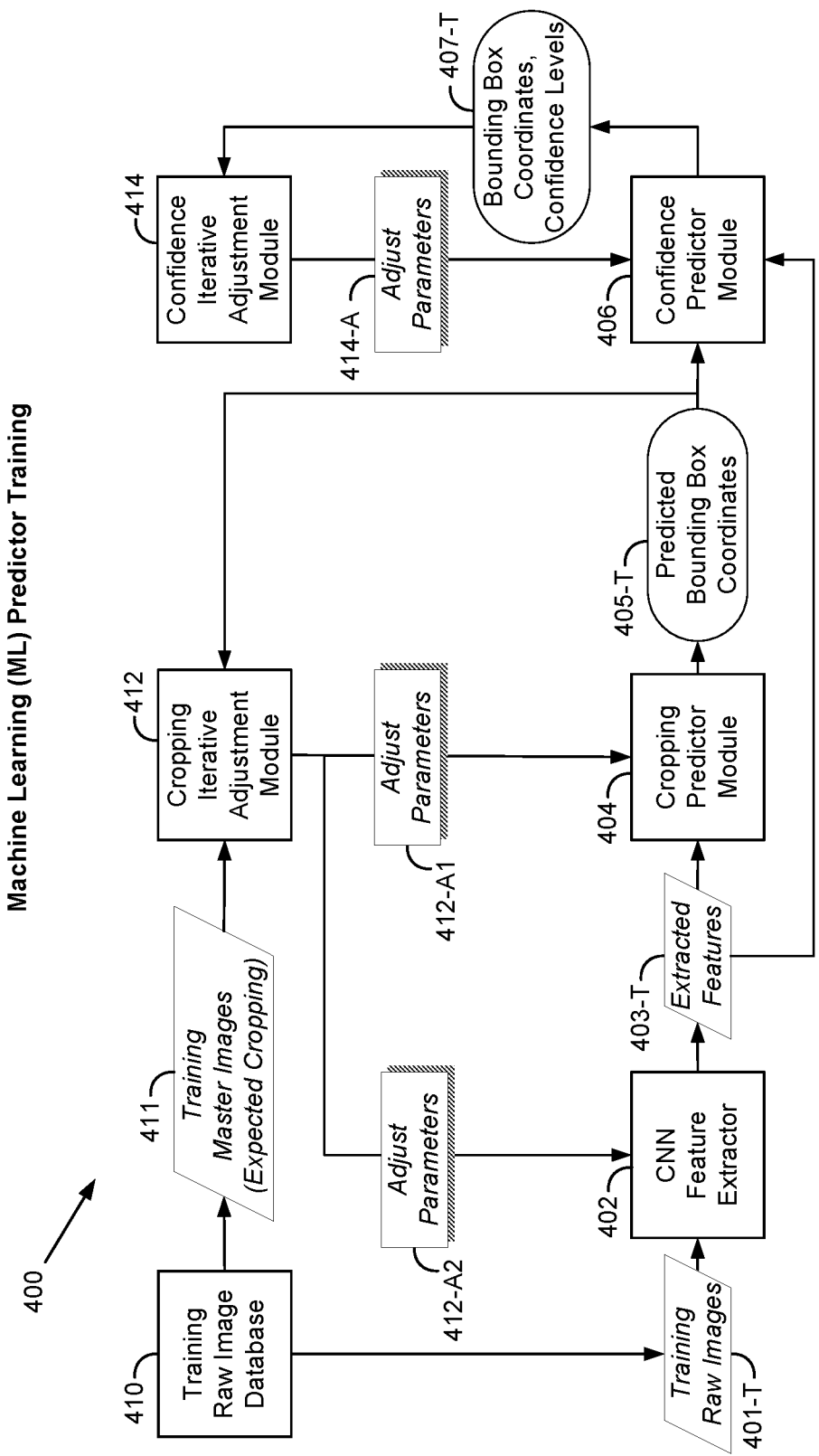
FIG. 4A illustrates an example architecture of an example ML predictor program operated in a training mode, in accordance with example embodiments.

As mentioned above, and in accordance with example embodiments, an ML predictor program may be implemented algorithmically using one or more ANNs, and in particular CNNs. Examples of such implementations are illustrated in FIGS. 4A, 4B, 4C, 5A, and 5B. FIG. 4A illustrates training of such an example implementation 400. While the example implementation in FIG. 4A may apply most directly to the implementation 400, the same or largely similar principles may be considered herein as applying to the other ANN implementations. As such, separate explicit descriptions of training examples for the other ANN implementation are not included herein.

The example ANN/CNN implementations also include computational functionality for predicting confidence levels of predicted cropping characteristics. By way of example, cropping characteristics are represented as bounding (or cropping) boxes. In example embodiments of application of an ML predictor to image cropping (FIGS. 4B and 4C), the primary inputs (after training) are raw images, and the primary outputs are predicted bounding boxes and associated confidence levels. Applied to image cropping, operation of an ML predictor system may be considered primarily as regression analysis, since predicted bounding boxes may be specified according to continuous values (e.g., cropping points), and confidence levels may be determined as continuous values between zero and one ([0,1]). In example embodiments of application of an ML predictor to video frame selection (FIGS. 5A and 5B), the primary inputs (after training) are video frame sequences, and the primary outputs are a selected frame (or frames) from each input sequence, based on confidence levels of predicted bounding boxes of the frames. Applied to video frame selection, operation of an ML predictor system may be considered as both classification and regression analysis, since predicted video frames may be specified according selection from among a known discrete set of elements (e.g., a sequence of video frames), and confidence levels may again be determined as continuous values between zero and one ([0,1]).

In FIG. 4A, an example CNN-based ML predictor program includes a CNN feature extractor 402, a cropping predictor module 404, and a confidence predictor module 406. The CNN feature extractor 402 may be implemented computationally as a CNN, while the cropping predictor module 404 and confidence predictor module 406 may be implemented by feed-forward ANNs, but not necessarily with CNNs. In accordance with example embodiments, a raw image may be input to the CNN feature extractor 402, which extracts features that are input to the cropping predictor module 404. The cropping predictor module 404 generates (outputs) a predicted bounding box, which is input, together with the extracted features, to the confidence predictor module 406. In practice, the predicted bounding box and extract features may be concatenated and input to the confidence predictor module 406 as a concatenation. The confidence predictor module 406 then predicts a confidence level for the predicted bounding box. Training the CNN-based ML predictor program may entail training the CNN feature extractor 402 to extract accurate features, training the cropping predictor module 404 to accurately predict bounding box coordinated (e.g., cropping points), and training the confidence predictor module 406 to accurately predict confidence levels of predicted bounding box coordinates.

In example training operation illustrated in FIG. 4A, training raw images 401-T are input from a training raw image database 410 to the CNN feature extractor 402, which inputs extracted features 403-T to the cropping predictor module 404. The cropping predictor module 404 generates predicted bounding box coordinates 405-T, which is input to the cropping iterative adjustment module 412. The cropping iterative adjustment module 412 also receives training master images 411 from the training raw image database, and iteratively adjusts parameters (412-A1) of the cropping predictor module 404 and (412-A2) of the CNN feature extractor 402 in order to achieve at least some threshold level of agreement between the predicted bounding box coordinates 405-T and the training master images 411 (truths). This aspect of the training therefore is aimed primarily at the accuracy the predicted bounding boxes.

As indicated, the predicted bounding box coordinates 405-T are also input to the confidence predictor module 406, together with the extracted features 403-T from the CNN feature extractor 402. While the extracted features 403-T and extracted features 403-T are shown as separate inputs to the confidence predictor module 406, they may be concatenated prior to input. The confidence predictor module 406 then predicts a confidence level 407-T for the predicted bounding box 405-T, and inputs the predicted confidence level(s) to the confidence iterative adjustment module. As the accuracy of predicted bounding box coordinates increases with training, the predicted confidence level also increases. As the confidence increases, the confidence iterative adjustment module 414 iteratively adjusts parameters (414-A) of the confidence predictor module 406. This aspect of the training therefore is aimed primarily at the accuracy the predicted confidence levels. By carrying it out concurrently with training of the cropping predictor module 404, while also providing examples of extracted features 403-T over the range of training, the confidence predictor module 406 learns how to predict confidence levels of predicted bounding box coordinates through recognition of both "good" and "bad" examples of predicted bounding box coordinates and the associated extracted features upon which the "good" and "bad" predictions are based.

In accordance with example embodiments, training master images may have weights associated with them when input to an ML predictor program or system, such as those examples described herein. The weights may be used to indicate an a priori importance or confidence to the system. This may be used to bias results of the computations so that the system takes the inputs as better or worse examples, depending on the associated weights. For example, higher weights may signify better examples, and vice versa. As described below, confidence levels of predicted cropping characteristics may be manually and/or automatically screened in order to identify results that may be candidates for discarding or possibly entered into the training database with high weighting values.

It should be noted that the discussion above in connection with the possible representational nature of the iterative model adjustment module 106 of systems 100 and 120 applies as well to the cropping iterative adjustment module 412 and the confidence iterative adjustment module 414 in FIG. 4A. Namely, these two modules of FIG. 4A may be considered as representing feedback-like operations for training the CNN feature extractor 410, the cropping predictor module 404, and the confidence predictor module 406. In practice, training these CNN and ANN-based program components may involve some form of computational back-propagation algorithm.

The example ML predictor program in FIG. 4A may be considered as being configured for prediction of just one cropping characteristic for each input raw image. For example, it may predict just one bounding box for any given raw image. Correspondingly, the example training operation illustrated in FIG. 4A may be considered as applying to just one predetermined cropping characteristic constraint. For example, just one aspect ratio, or just one aspect ratio and size. Example ANN-based ML predictor programs discussed below, particularly those in FIGS. 4C and 5B, may be configured to generate sets of multiple cropping characteristics for any given input raw image. For example, some implementations may be configured to predict multiple bounding boxes, each associated with a different fixed aspect-ratio constraint, for an input raw image. As described below, such an implementation may include a separate cropping predictor module and a separate confidence predictor module for each fixed aspect-ratio constraint.

In accordance with example embodiments, training an ML predictor program that is configured to generate sets of multiple cropping characteristics for any given input raw image may be implemented as a straightforward extension to the example operation discussed in connection with FIG. 4A. For example, training an ML predictor program that is configured to generate predicted bounding boxes for each of N fixed aspect ratios may entail concurrently training each separate cropping predictor module and separate confidence predictor module. While not explicitly shown in FIG. 4A, this concurrent training may be accomplished with a straightforward extension of the implementation illustrated in the figure. In particular, training master images may include examples of multiple cropping versions of some or all of the training raw images. As noted above, training for multiple sets of cropping-characteristic constraints (e.g., multiple aspect ratios) may be carried out separately for each constraint or concurrently for some or all constraints. Which approach is used may be determined through testing and evaluation of both approaches, for example.

For both training and runtime, an input raw image to an ANN or CNN may be, or include, pixel values of the image, possibly as well as other ancillary information, such as cropping-characteristic constraints (e.g., a fixed aspect), for example. In particular, the input layer of a CNN may include an input node for each pixel, possibly as well as input nodes for values associated with ancillary information. For purposes of computational efficiency and/or design, it may be necessary or desirable to reformat a raw image prior to inputting it to the CNN (or other form or ANN). In one example, raw images may be scaled to a standard size and formatted to be square. For example each image may be mathematically transformed to a square pixel array of a standard, fixed size. If the original raw image is not already square (e.g., has an aspect ratio not equal to one), the reformatting the raw image may entail including or adding pixels where no image data exists. By standardizing the size and format (e.g., square array) of input raw images, a single size CNN may be applied to all input raw images.

Figure 7:
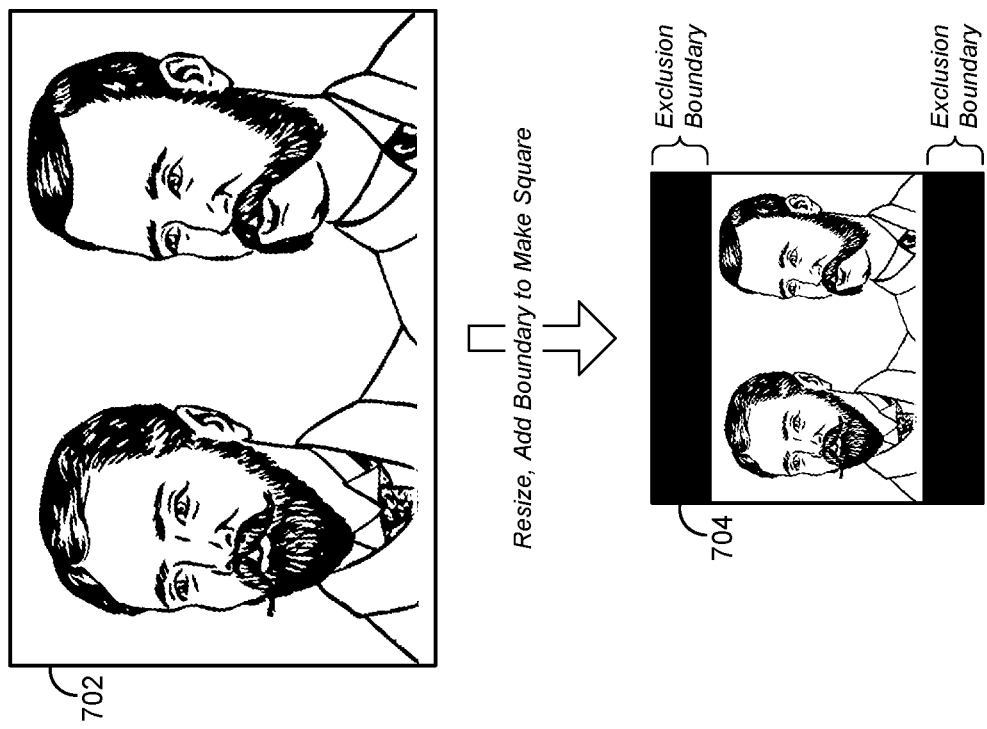
FIG. 7 illustrates reformatting of a raw image, in accordance with example embodiments.

FIG. 7 illustrates an example of such reformatting. A rectangular raw image 702 with a non-unity (not equal to one) aspect ratio is shown at the top of the figure. A reformatted version 704 that is smaller and square (aspect ratio equal to one) is shown at the bottom of the figure. In order to accommodate the non-unity aspect ratio of the original raw image 702 (e.g., without distorting the original aspect ratio), two exclusion boundaries are added to the reformatted image—one above and one below the shrunken image in the reformatted version 704. For purposed of illustration, the exclusion boundaries are show as black stripes.

In accordance with example embodiments, the CNN or other input ANN of ML predictor systems described herein may be configured to recognize exclusion boundaries of an input raw image, and to exclude or omit the pixel (or data) values of the exclusion regions from consideration in the computations and calculations carried out on the data. For example, exclusion boundaries may be defined according to a particular pixel (or data) value that is recognized by the CNN as an invalid value. An input node that receives such a value may then set its output to zero, for example. Other techniques for recognizing exclusion boundaries may be used as well.

B. Example Application to Automated Image Cropping

Figure 4B:
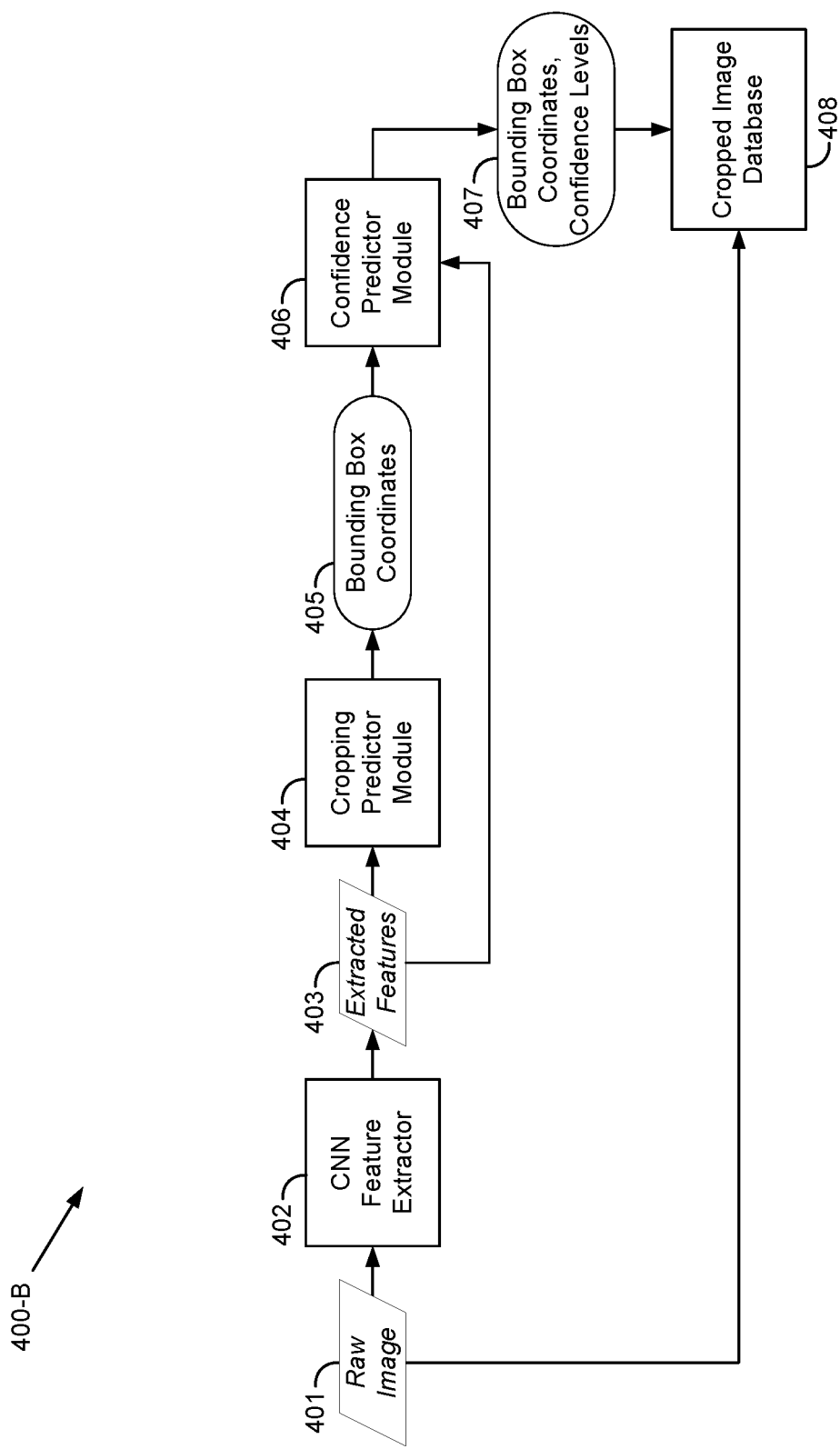
FIG. 4B illustrates an example architecture of an example ML predictor program as applied to automated image cropping, in accordance with example embodiments.

FIG. 4B illustrates an example architecture of an example ML predictor program 400-B as applied to automated image cropping, in accordance with example embodiments. In particular, the example ML predictor program 400-B shows the same basic arrangement as the one in the training example of FIG. 4A, including the CNN feature extractor 402, the cropping predictor module 404, and the confidence predictor module 406. As such, the program 400-B may be considered as being configured to generate just one bounding box per input raw image, corresponding to just one aspect-ratio constraint, for example. The program 400-B also includes a cropped image database 408 for storing cropped images. In the illustration of FIG. 4B, the ML predictor program 400-B may be taken to be a trained system.

During runtime, a raw image 401 may be input to the CNN feature extractor 402, which generates extracted features 403 that are input to the cropping predictor module 404. The cropping predictor module 404 then generates predicted bounding box coordinates 405, which are input, together with extracted features 403, to the confidence predictor module 406. As noted above, the predicted bounding box coordinates 405 and the extracted features 403 may be concatenated before being input to the confidence predictor module. The confidence predictor module then generates a predicted confidence level and outputs the bounding box and confidence level 407 to the cropped image database 408. As indicated, the raw image may also be stored in the cropped image database. In an example embodiment, cropped images may be stored as raw images and associated bounding boxes and confidence levels. In other example embodiments, bounding boxes may be applied to raw images to generate actual cropped images that may be separate from the associated raw images.

Figure 4C:
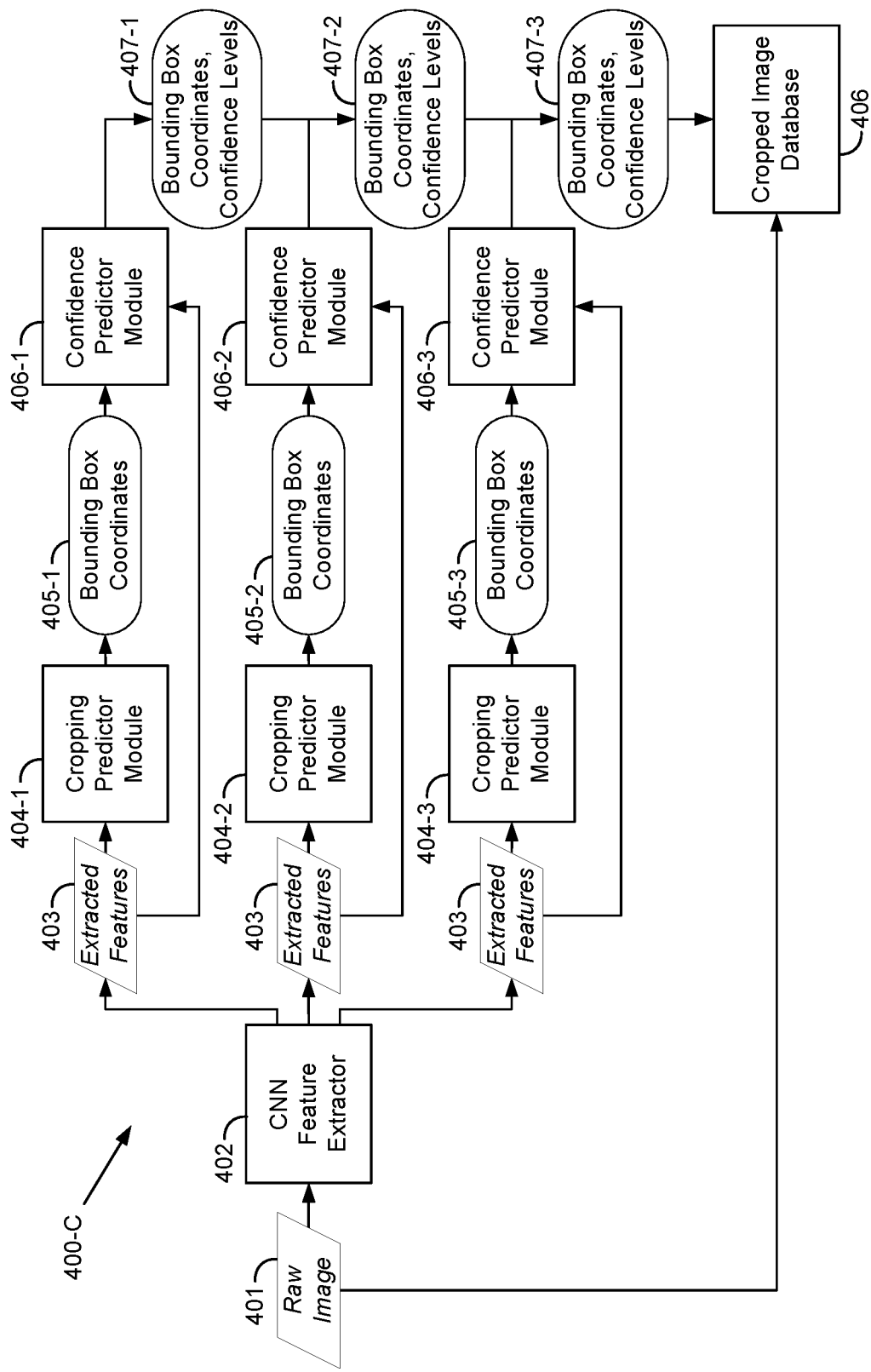
FIG. 4C illustrates another example architecture of an example ML predictor program as applied to automated image cropping, in accordance with example embodiments.

FIG. 4C illustrates another example architecture of an example ML predictor program 400-C also as applied to automated image cropping, in accordance with example embodiments. In this embodiment, the example ML predictor program 400-C extends the basic arrangement shown the training example of FIG. 4A to a configuration for predicting multiple bounding boxes for each input raw image. By way of example, program 400-C is configured for predicting three bounding boxes and associated predicted confidence levels for any given input raw image.

As shown, the ML predictor program 400-C includes a CNN feature extractor 402 and a cropped image database 408 for storing cropped images. In addition, the system 400-C includes three cropping predictor modules 404-1, 404-2, and 404-3, and three respectively associated confidence predictor modules 406-1, 406-2, and 406-3. Each cropping predictor module may predict bounding boxes for a different fixed aspect ratio (or other cropping-characteristic constraint), and each confidence predictor module may predict the respectively associated confidence level of the predicted bounding box.

During runtime, a raw image 401 may be input to the CNN feature extractor 402, which generates extracted features 403 that are input to all of the cropping predictor modules 404-1, 404-2, and 404-3. The cropping predictor modules 404-1, 404-2, and 404-3 then generate respective predicted bounding box coordinates 405-1, 405-2, and 405-3, which are respectively input, together with extracted features 403, to the confidence predictor modules 406-1, 406-2, and 406-3. Again, the predicted bounding box coordinates and the extracted features may be concatenated before being input to the confidence predictor modules.

The confidence predictor modules 406-1, 406-2, and 406-3 then generate respective predicted confidence levels, and output the bounding boxes and confidence levels 407-1, 407-2, and 407-3 to the cropped image database 408. As indicated, the raw image may also be stored in the cropped image database. As in the example embodiment of FIG. 4B, cropped images may be stored as raw images and associated bounding boxes and confidence levels. In other example embodiments, bounding boxes may be applied to raw images to generate actual cropped images that may be separate from the associated raw images.

As noted above, predicted confidence levels of predicted cropping characteristics, such as predicted bounding boxes, may be manually and/or automatically screened and evaluated. Such evaluation may be used, for example, to discard results with confidence levels below some threshold (e.g., 0.6), or to flag results with high confidence levels (e.g., 0.9) as candidates for highly-weighted training examples.

C. Example Application to Automated Video Frame Selection

Figure 5A:
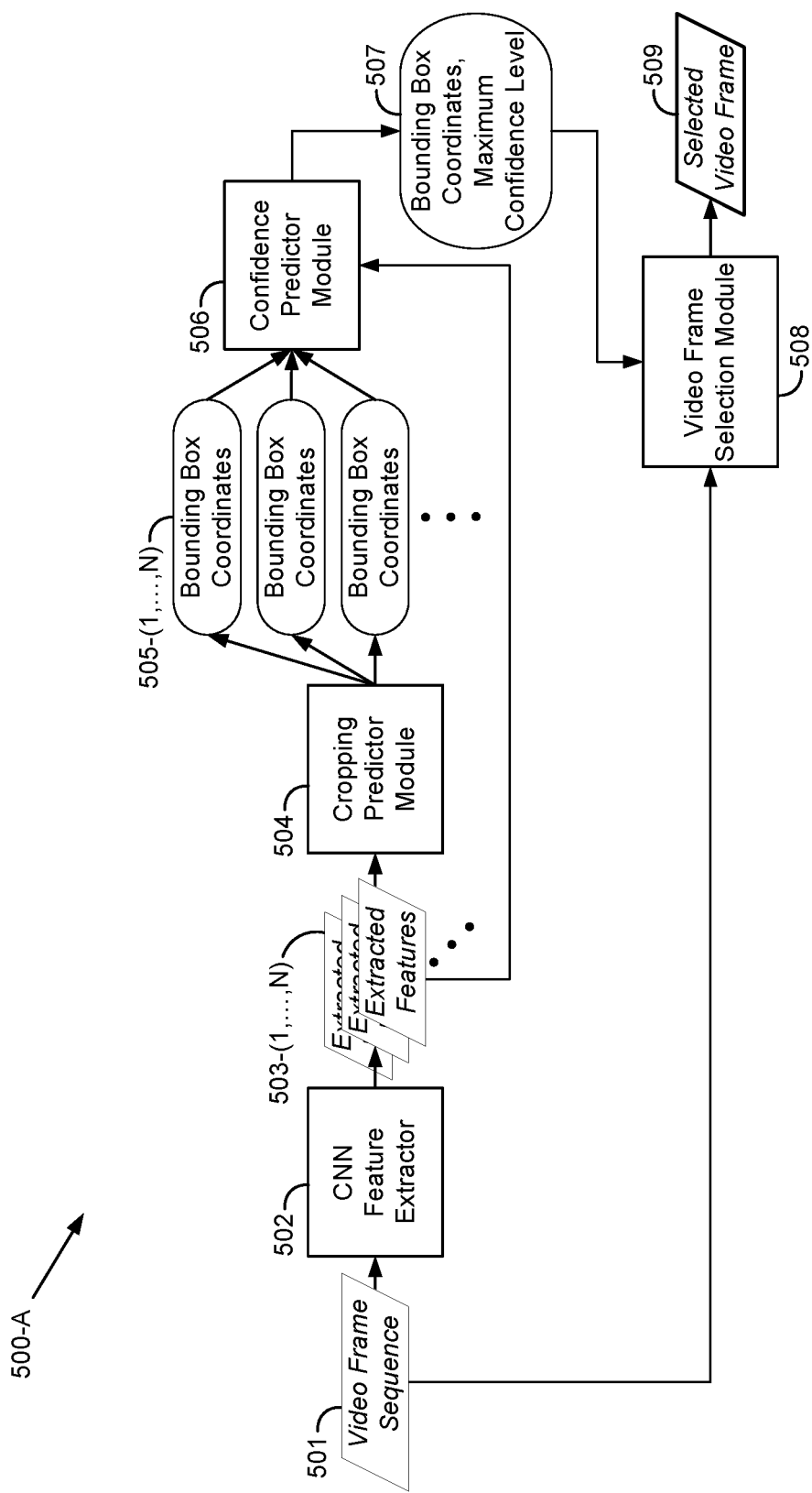
FIG. 5A illustrates an example architecture of an example ML predictor program as applied to automated video frame selection, in accordance with example embodiments.

FIG. 5A illustrates an example architecture of an example ML predictor program 500-A as applied to automated video frame selection, in accordance with example embodiments. The input to the program 500-A is a video frame sequence 501, and the output is a selected frame of the input sequence. The example ML predictor program 500-A includes a CNN feature extractor 502, a cropping predictor module 504, a confidence predictor module 506, and a video frame selection module 508. The program 500-A may be considered as being configured to generate just one bounding box and associated confidence level prediction for each frame of an input video frame sequence, corresponding to just one aspect-ratio constraint, for example.

During runtime, a video frame sequence 501, containing N frames, for example, may be input to the CNN feature extractor 502, which generates a extracted features 503-(1, ..., N), respectively, for each input frame. The extracted features are input to the cropping predictor module 504, which generates predicted bounding boxes 505-(1, ..., N), respectively, for each input frame. The predicted bounding boxes are input, together with extracted features 503-(1, ..., N), to the confidence predictor module 506. Each predicted bounding may be concatenated with the associated extracted features before being input to the confidence predictor module 506. The confidence predictor module then generates a respective predicted confidence level for each input frame, determines the maximum confidence level from among them, outputs bounding box and associated confidence level 507 of the determined maximum. The bounding box and associated maximum confidence level is then input to the video frame selection module 508, which also receives the video frame sequence 501 as input. The video frame selection module 508 uses identifying information in the bounding box and associated confidence level 507 to identify the corresponding video frame, selects the identified frame and outputs it as selected video frame 509.

In an example embodiment, the confidence predictor module 506 may output all of the predicted bounding boxes 505-(1, ..., N) and their associated predicted confidence levels to the video frame selection module 508. The video frame selection module 508 may then determine the maximum confidence level and make the frame selection accordingly.

Figure 5B:
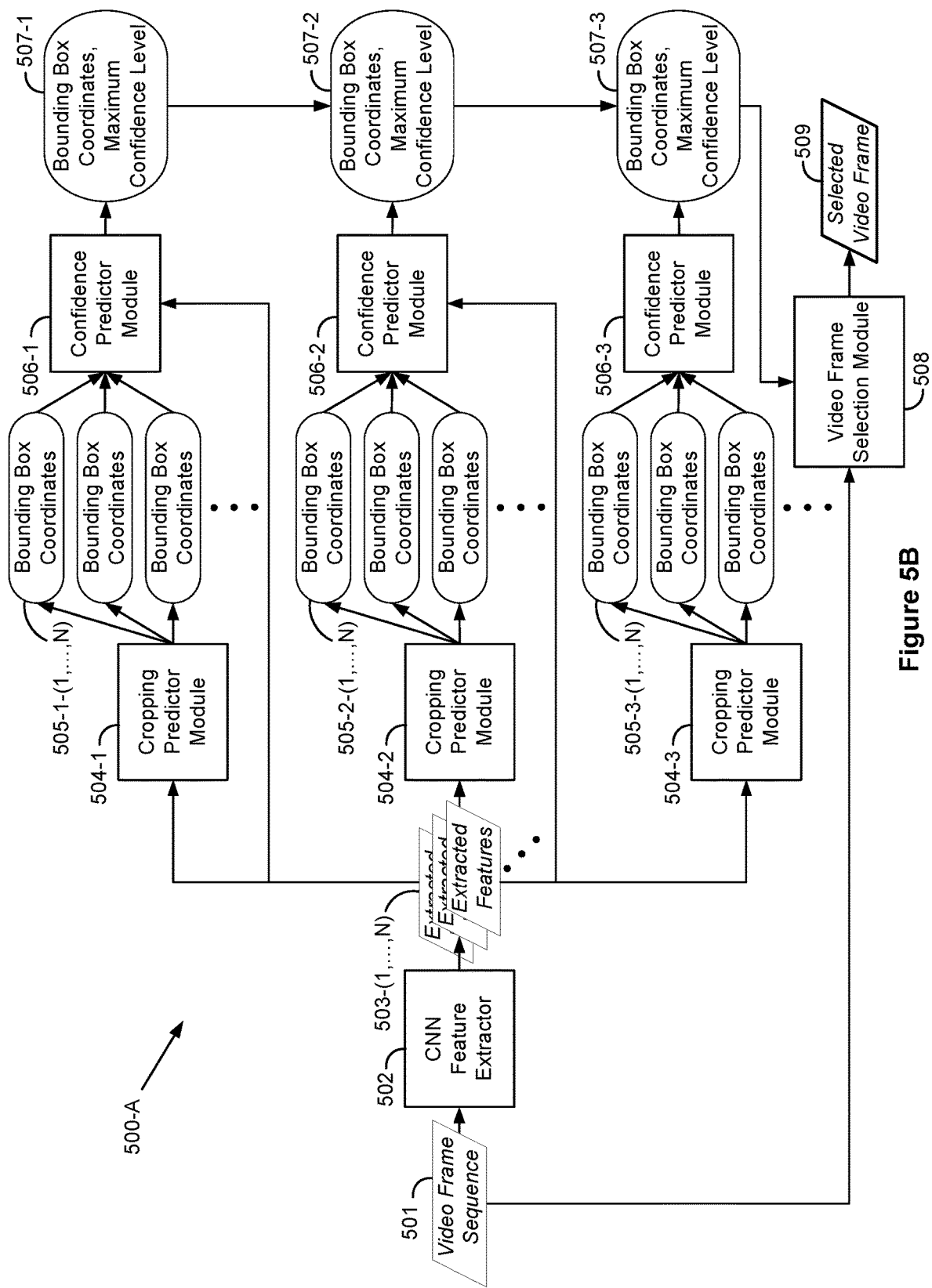
FIG. 5B illustrates another example architecture of another example ML predictor program as applied to automated video frame selection, in accordance with example embodiments.

FIG. 5B illustrates another example architecture of another example ML predictor program as applied to automated video frame selection, in accordance with example embodiments. In this embodiment, the example ML predictor program 500-B extends the arrangement shown FIG. 5A to a configuration for predicting multiple bounding boxes and associated confidence levels for each input frame of a video sequence 501. By way of example, program 500-B is configured for predicting three bounding boxes and associated predicted confidence levels each video frame of the input video frame sequence.

The example ML predictor program 500-B includes the CNN feature extractor 502 and the video frame selection module 508. In addition, the system 500-B includes three cropping predictor modules 504-1, 504-2, and 504-3, and three respectively associated confidence predictor modules 506-1, 506-2, and 506-3. Each cropping predictor module may predict bounding boxes for a different fixed aspect ratio (or other cropping-characteristic constraint), and each confidence predictor module may predict the respectively associated confidence level of the predicted bounding box. The program 500-A may be considered as being configured to generate three bounding boxes and associated confidence level predictions for each frame of an input video frame sequence, corresponding to three aspect-ratio constraint, for example.

During runtime, a video frame sequence 501, containing N frames, for example, may be input to the CNN feature extractor 502, which generates a extracted features 503-(1, . . . , N), respectively, for each input frame. The extracted features are input to the cropping predictor modules 504-1, 504-2, and 504-3, which generate predicted bounding boxes 505-1-(1, . . . , N), 505-2-(1, . . . , N), and 505-2-(1, . . . , N), respectively, for each input frame. The predicted bounding boxes are respectively input, together with extracted features 503-(1, . . . , N), to the associated confidence predictor modules 506-1, 506-2, and 506-3. Each predicted bounding may be concatenated with the associated extracted features before being input to the respective, associated confidence predictor modules. Each confidence predictor module then generates a respective predicted confidence level for each input frame and determines the maximum confidence level from among them. The confidence predictor modules 506-1, 506-2, and 506-3 the respectively output bounding boxes and associated confidence levels 507-1, 507-2, and 507-3, each corresponding to a maximum confidence level for a given fixed aspect-ratio constraint (or other cropping-characteristic constraint). The bounding boxes and associated maximum confidence levels are then input to the video frame selection module 508, which also receives the video frame sequence 501 as input. The video frame selection module 508 may treat the input confidence levels as respective scores, and then select the highest score among them. The highest score and identifying information in the bounding box and associated confidence level may be used to identify the corresponding video frame, which may then be selected and output as selected video frame 509.

IV. Example Methods

A. Example Method of Automated Image Cropping

Figure 8:
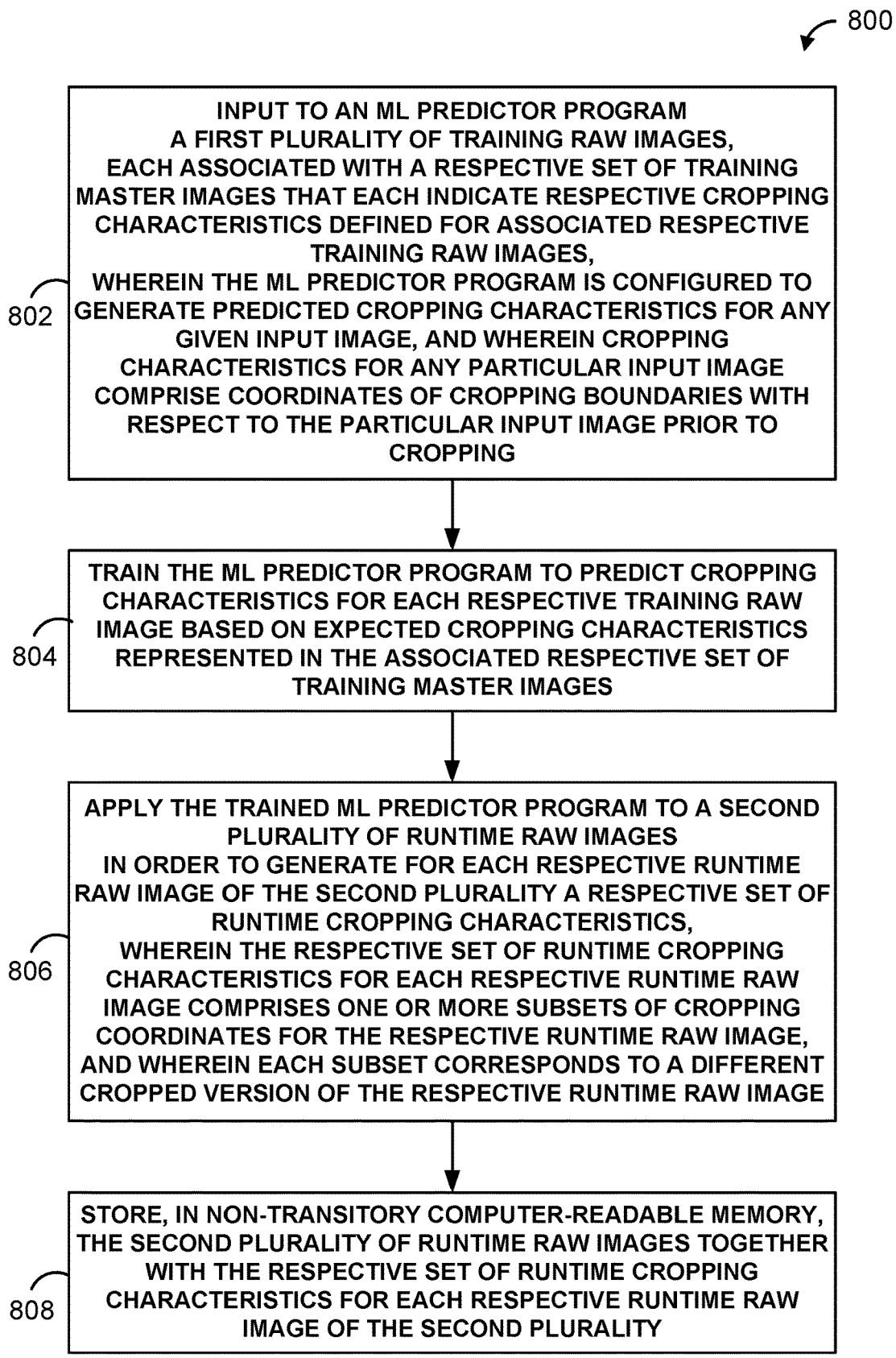
FIG. 8 is a flow chart of an example method of automated image cropping, in accordance with example embodiments.

FIG. 8 illustrates a flow chart of an example method 800 that may be carried out by an ML predictor system, such as ML predictor system 100 shown in FIG. 1A, as applied to automated image cropping. Example method 800 may be implemented in computer-readable instructions stored in a non-transitory computer-readable medium, and carried out by one or more processors of a system. In an example embodiment, the instructions, when carried out by the one or more processors of the system, may cause the system to carry out the method. The description below refers to a computing device involved in a number of the operations. It should be understood that multiple references to a computing device may refer to the same computing device in some or all of the operations, or a different computing devices in some or all of the operations.

At block 802, a first plurality of training raw images may be input to an ML predictor program. Each respective training raw image of the first plurality may be associated with a respective set of training master images, and each training master image of a given respective set of training master images may indicate respective cropping characteristics defined for the associated respective training raw image. The ML predictor program may be configured to generate predicted cropping characteristics for any given input image, and the cropping characteristics for any particular input image may include coordinates of cropping boundaries with respect to the particular input image prior to cropping.

At block 804, the ML predictor program may be trained to predict cropping characteristics for each respective training raw image based on expected cropping characteristics represented in the associated respective set of training master images.

At block 806, subsequent to training, the ML predictor program may be applied to a second plurality of runtime raw images in order to generate for each respective runtime raw image of the second plurality a respective set of runtime cropping characteristics. The respective set of runtime cropping characteristics for each respective runtime raw image may include one or more subsets of cropping coordinates for the respective runtime raw image, and each subset may correspond to a different cropped version of the respective runtime raw image.

Finally, at block 808, the second plurality of runtime raw images together with the respective set of runtime cropping characteristics for each respective runtime raw image of the second plurality may be store in non-transitory computer-readable memory. For example, storage may be in a cropped image database.

In accordance with example embodiments, training the ML predictor program may entail generating respective model cropping characteristics according a computational model for each respective training raw image. Then, for each respective training raw image, respective deviations may be computed between the generated respective model cropping characteristics and the expected cropping characteristics represented in the respective set of training master images associated with the respective training raw image. Parameters of the computational model may be adjusted so as to simultaneously minimize all of the computed respective deviations.

In further accordance with example embodiments, the example method may further entail applying a weighting function to the cropping characteristics represented in the associated respective set of training master images in order to cause an increased agreement between predicted cropping characteristics and more highly-weighted expected cropping characteristics, compared with the agreement between predicted cropping characteristics and less highly-weighted expected cropping characteristics.

In accordance with example embodiments, the ML predictor program may include an artificial neural network (ANN). As such, training may entail training the ANN to predict the cropping characteristics for each respective training raw image to within a threshold confidence level. In addition, applying the trained ML predictor program to the second plurality of runtime raw images may entail applying the trained ANN to the second plurality of runtime raw images to predict the respective set of runtime cropping characteristics for each of the second plurality of runtime raw images.

In accordance with example embodiments, inputting the first plurality of training raw images to the ML predictor program may entail retrieving the first plurality of training raw images from a training-image database. In an example, the training-image database may include the first plurality of training raw images and the associated respective sets of training master images.

In accordance with example, the associated respective sets of training master images may include cropping data indicative of the respective cropping characteristics. Non-limiting example of cropping data may include cropped images and/or coordinates defining cropping boundaries with respect to associated respective raw images in uncropped form.

In accordance with example embodiments, the cropping characteristics of each respective set of training master images may define one or more rectangular training bounding boxes, each enclosing a respective region of interest (ROI) of the associated training raw image. Further, each rectangular training bounding box may have a respective fixed aspect ratio specified according to a set of predetermined training aspect ratios.

In further accordance with example embodiments, training the ML predictor program to predict the cropping characteristics for each respective training raw image may entail training the ML predictor program to predict the one or more training rectangular bounding boxes and respective ROIs of the respective set of training master images associated with each respective training raw image. Further, applying the trained ML predictor program to the second plurality of runtime raw images may entail applying the trained ML predictor program to the second plurality of runtime raw images to predict for each respective runtime raw image one or more respective runtime rectangular bounding boxes and associated ROIs.

In further accordance with example embodiments, each respective runtime rectangular bounding box may have a respective runtime aspect ratio, and the method may further entail, for each respective runtime rectangular bounding box, comparing the respective runtime aspect ratio to a most closely matching fixed aspect ratio from the set of predetermined training aspect ratios in order to compute a confidence level of the prediction of the respective runtime rectangular bounding box.

In accordance with example embodiments, the example method may further entail recognizing an exclusion boundary around any particular image, and excluding any portion of the any particular image within the exclusion boundary from consideration in computations to predict the cropping characteristics of the any particular image.

In accordance with example embodiments, the second plurality of runtime raw images may include digital still images of digital streaming media content. In this instance, each cropped version of the respective runtime raw image may be configured for display in a promotional communication associated with the streaming media content, and/or electronic program control of the streaming media content.

Example method 800 as described entails both training and runtime operation of an example ML predictor system. Alternative embodiments may entail only training of an example ML predictor system, or only runtime operation of a trained of an example ML predictor system.

B. Example Method of Automated Video Frame Selection

Figure 9:
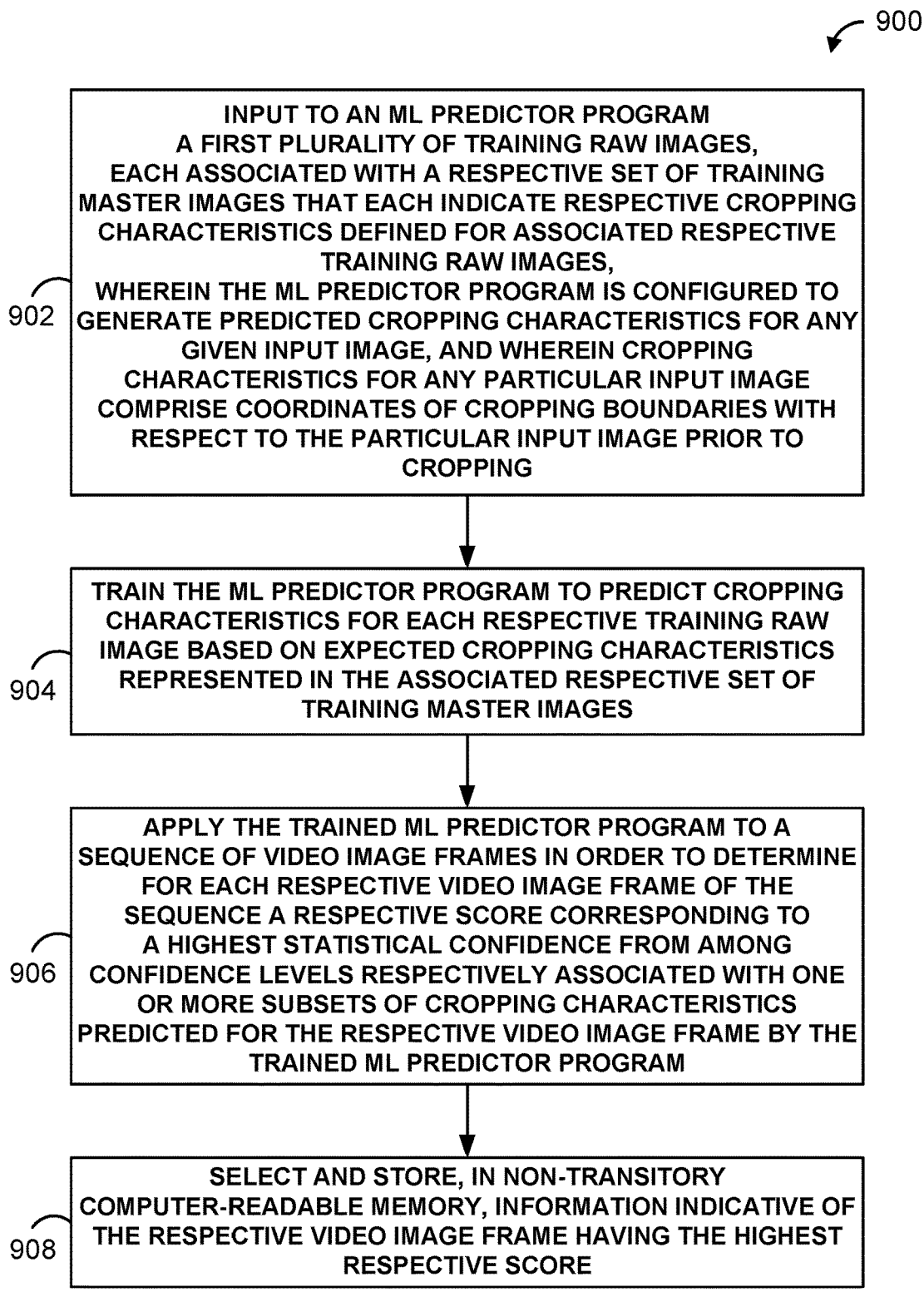
FIG. 9 is a flow chart of another example method of automated video frame selection, in accordance with example embodiments.

FIG. 9 illustrates a flow chart of an example method 900 that may be carried out by an ML predictor system, such as ML predictor system 120, shown in FIG. 1B, as applied to automated selection of video frames. As with example method 800, example method 900 may be implemented in computer-readable instructions stored in a non-transitory computer-readable medium, and carried out by one or more processors of a system. In an example embodiment, the instructions, when carried out by the one or more processors of the system, may cause the system to carry out the method. The description below refers to a computing device involved in a number of the operations. It should be understood that multiple references to a computing device may refer to the same computing device in some or all of the operations, or a different computing devices in some or all of the operations.

At block 902, a first plurality of training raw images may be input to an ML predictor program. Each respective training raw image of the first plurality may be associated with a respective set of training master images, and each training master image of a given respective set of training master images may indicate respective cropping characteristics defined for the associated respective training raw image. The ML predictor program may be configured to generate predicted cropping characteristics for any given input image, and the cropping characteristics for any particular input image may include coordinates of cropping boundaries with respect to the particular input image prior to cropping.

At block 904, the ML predictor program may be trained to predict cropping characteristics for each respective training raw image based on expected cropping characteristics represented in the associated respective set of training master images.

At block 906, subsequent to training the ML predictor program with the first plurality of training raw images, the ML predictor program may be applied to a sequence of video image frames in order to determine for each respective video image frame of the sequence a respective score. Each respective score may correspond to a highest statistical confidence from among confidence levels respectively associated with one or more subsets of cropping characteristics predicted for the respective video image frame.

Finally, at block 908, information indicative of the respective video image frame having the highest respective score may be selected and stored in non-transitory computer-readable memory. For example, storage may be in a cropped image database.

In accordance with example embodiments, training the ML predictor program may entail generating respective model cropping characteristics according a computational model for each respective training raw image. Then, for each respective training raw image, respective deviations may be computed between the generated respective model cropping characteristics and the expected cropping characteristics represented in the respective set of training master images associated with the respective training raw image. Parameters of the computational model may be adjusted so as to simultaneously minimize all of the computed respective deviations.

In accordance with example embodiments, the ML predictor program may include an artificial neural network (ANN). As such, training may entail training the ANN to predict the cropping characteristics for each respective training raw image to within a threshold confidence level. In addition, applying the trained ML predictor program to the sequence of video image frames may entail applying the trained ANN to the sequence of video image frames to generate for each respective video image frame the predicted one or more subsets of cropping characteristics and the associated respective confidence levels. Then, for each respective video image frame, the predicted subset having the highest associated confidence level may be selected, and the respective score set to the associated confidence level of the selected predicted sub set.

In accordance with example embodiments, selecting and storing the information indicative of the respective video image frame having the highest respective score may entail determining the highest score from among the respective scores, and identifying the respective video frame associated with the highest score. Then, the identified respective video frame together with information identifying both the respective video frame and the subset associated with respective confidence level corresponding to the highest score may be stored.

In accordance with example embodiments, inputting the first plurality of training raw images to the ML predictor program may entail retrieving the first plurality of training raw images from a training-image database. In an example, the training-image database may include the first plurality of training raw images and the associated respective sets of training master images.

In accordance with example, the associated respective sets of training master images may include cropping data indicative of the respective cropping characteristics. Non-limiting example of cropping data may include cropped images and/or coordinates defining cropping boundaries with respect to associated respective raw images in uncropped form.

In accordance with example embodiments, the cropping characteristics of each respective set of training master images may define one or more rectangular training bounding boxes, each enclosing a respective region of interest (ROI) of the associated training raw image. Further, each rectangular training bounding box may have a respective fixed aspect ratio specified according to a set of predetermined training aspect ratios.

In further accordance with example embodiments, training the ML predictor program to predict the cropping characteristics for each respective training raw image may entail training the ML predictor program to predict the one or more training rectangular bounding boxes and respective ROIs of the respective set of training master images associated with each respective training raw image. Further, applying the trained ML predictor program to the sequence of video image frames may entail applying the trained ML predictor program to the sequence of video frames to predict for each respective video frame one or more respective runtime rectangular bounding boxes and associated ROIs.

In further accordance with example embodiments, each respective runtime rectangular bounding box may have a respective runtime aspect ratio, and the method may further entail, for each respective runtime rectangular bounding box, comparing the respective runtime aspect ratio to a most closely matching fixed aspect ratio from the set of predetermined training aspect ratios in order to compute a confidence level of the prediction of the respective runtime rectangular bounding box.

In accordance with example embodiments, the example method may further entail providing for display on a display device a cropped version the respective video frame having the highest respective score. In particular, the cropped version the respective video frame may correspond to the respective video frame cropped according to the associated cropping characteristics.

In further accordance with example, the sequence of video frames may include or represent digital streaming media content. As such, display of the cropped version the respective video frame having the highest respective score may serve as promotional communication associated with the streaming media content, or electronic program control of the streaming media content.

Example method 900 as described entails both training and runtime operation of an example ML predictor system. Alternative embodiments may entail only training of an example ML predictor system, or only runtime operation of a trained of an example ML predictor system.

V. Example Variations

Although the examples and features described above have been described in connection with specific entities and specific operations, in practice, there are likely to be many instances of these entities and many instances of these operations being performed, perhaps contemporaneously or simultaneously, on a large scale. Indeed, in practice, the ML predictor system 100 is likely to include many television broadcasting systems (each potentially transmitting content on many channels) and many content presentation devices, with some or all of the described operations being performed on a routine and repeating basis.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method carried out by a machine learning (ML) predictor program implemented on a computing device and configured for generating predicted cropping characteristics for input images, wherein cropping characteristics for any given input image comprise coordinates of cropping boundaries with respect to the any given input image prior to cropping, the method comprising:

receiving one or more uncropped images by the computing device;

applying the ML predictor program to the one or more uncropped images in order to generate for each respective uncropped image of the one or more uncropped images a respective set of runtime cropping characteristics, wherein the respective set of runtime cropping characteristics for each respective uncropped image comprises one or more subsets of cropping coordinates for the respective uncropped image, and wherein each subset corresponds to a different cropped version of the respective uncropped image; and storing, in non-transitory computer-readable memory, the one or more uncropped images together with the respective set of runtime cropping characteristics for each respective uncropped image of the one or more uncropped images, wherein, prior to receiving the one or more uncropped images, the ML predictor program has been trained to predict cropping characteristics for each respective training raw image of a plurality of training raw images, based on expected cropping characteristics represented in a respective set of training master images associated with the respective training raw image, and wherein each training master image of the respective set of training master images indicates respective cropping characteristics defined for the associated respective training raw image.

2. The method of claim 1, further comprising:
for each respective set of runtime cropping characteristics associated with each respective uncropped image, computing a predicted confidence level of each of the one or more subsets of cropping coordinates; and
storing, in the non-transitory computer-readable memory, the predicted confidence levels of the one or more subsets together with the respective set of runtime cropping characteristics for each respective uncropped image of the one or more uncropped images.

3. The method of claim 1, wherein storing, in the non-transitory computer-readable memory, the one or more uncropped images together with the respective set of runtime cropping characteristics for each respective uncropped image of the one or more uncropped images comprises storing each respective uncropped image together with at least one of:
metadata corresponding to the respective set of runtime cropping characteristics, wherein the metadata are applicable to the respective uncropped image to create each different cropped version of the respective uncropped image; or
each different cropped version of the respective uncropped image generated by application of the set of runtime cropping characteristics to the respective uncropped image.

4. The method of claim 1, wherein the ML predictor program comprises an artificial neural network (ANN),
and wherein applying the ML predictor program to the one or more uncropped images in order to generate for each respective uncropped image of the one or more uncropped images the respective set of runtime cropping characteristics comprises applying the ANN to the one or more uncropped images to predict the respective set of runtime cropping characteristics for each of the one or more uncropped images.

5. The method of claim 1, wherein the cropping characteristics of each respective set of training master images define one or more rectangular training bounding boxes, each enclosing a respective region of interest (ROI) of the respective training raw image associated with the respective set of training master image,
and wherein each rectangular training bounding box has a respective fixed aspect ratio specified according to a set of predetermined training aspect ratios.

6. The method of claim 5, wherein applying the ML predictor program to the one or more uncropped images in order to generate for each respective uncropped image of the one or more uncropped images the respective set of runtime cropping characteristics comprises applying the ML predictor program to the one or more uncropped images to predict for each respective runtime raw image one or more respective runtime rectangular bounding boxes.

7. The method of claim 1, further comprising:
recognizing, by the ML predictor program, an exclusion boundary around any particular image; and
excluding, by the ML predictor program, any portion of the any particular image within the exclusion boundary from consideration in computations to predict the cropping characteristics of the any particular image.

8. The method of claim 1, wherein the one or more uncropped images comprise digital still images of digital streaming media content,
and wherein each cropped version of the respective uncropped image is configured for display in at least one of promotional communication associated with the streaming media content, or electronic program control of the streaming media content.

9. A system configured for generating predicted cropping characteristics for input images, wherein cropping characteristics for any given input image comprise coordinates of cropping boundaries with respect to the any given input image prior to cropping, the system comprising:
one or more processors; and
memory storing instructions that, when executed by the one or more processors, cause the system to carry out operations of a machine learning (ML) predictor program, wherein the operations include:
receiving one or more uncropped images;
applying the ML predictor program to the one or more uncropped images in order to generate for each respective uncropped image of the one or more uncropped images a respective set of runtime cropping characteristics, wherein the respective set of runtime cropping characteristics for each respective uncropped image comprises one or more subsets of cropping coordinates for the respective uncropped image, and wherein each subset corresponds to a different cropped version of the respective uncropped image; and
storing, in non-transitory computer-readable memory, the one or more uncropped images together with the respective set of runtime cropping characteristics for each respective uncropped image of the one or more uncropped images,
wherein, prior to receiving the one or more uncropped images, the ML predictor program has been trained to predict cropping characteristics for each respective training raw image of a plurality of training raw images, based on expected cropping characteristics represented in a respective set of training master images associated with the respective training raw image,
and wherein each training master image of the respective set of training master images indicates respective cropping characteristics defined for the associated respective training raw image.

10. The system of claim 9, wherein the operations further include:
for each respective set of runtime cropping characteristics associated with each respective uncropped image, computing a predicted confidence level of each of the one or more subsets of cropping coordinates; and
storing, in the non-transitory computer-readable memory, the predicted confidence levels of the one or more subsets together with the respective set of runtime cropping characteristics for each respective uncropped image of the one or more uncropped images.

11. The system of claim 9, wherein storing, in the non-transitory computer-readable memory, the one or more uncropped images together with the respective set of runtime cropping characteristics for each respective uncropped image of the one or more uncropped images comprises storing each respective uncropped image together with at least one of:
metadata corresponding to the respective set of runtime cropping characteristics, wherein the metadata are applicable to the respective uncropped image to create each different cropped version of the respective uncropped image; or
each different cropped version of the respective uncropped image generated by application of the set of runtime cropping characteristics to the respective uncropped image.

12. The system of claim 9, wherein the ML predictor program comprises an artificial neural network (ANN),
and wherein applying the ML predictor program to the one or more uncropped images in order to generate for each respective uncropped image of the one or more uncropped images the respective set of runtime cropping characteristics comprises applying the ANN to the one or more uncropped images to predict the respective set of runtime cropping characteristics for each of the one or more uncropped images.

13. The system of claim 9, wherein the cropping characteristics of each respective set of training master images define one or more rectangular training bounding boxes, each enclosing a respective region of interest (ROI) of the respective training raw image associated with the respective set of training master image,
and wherein each rectangular training bounding box has a respective fixed aspect ratio specified according to a set of predetermined training aspect ratios.

14. The system of claim 13, wherein applying the ML predictor program to the one or more uncropped images in order to generate for each respective uncropped image of the one or more uncropped images the respective set of runtime cropping characteristics comprises applying the ML predictor program to the one or more uncropped images to predict for each respective runtime raw image one or more respective runtime rectangular bounding boxes.

15. The system of claim 9, wherein the operations further include:
recognizing, by the ML predictor program, an exclusion boundary around any particular image; and
excluding, by the ML predictor program, any portion of the any particular image within the exclusion boundary from consideration in computations to predict the cropping characteristics of the any particular image.

16. The system of claim 9, wherein the one or more uncropped images comprise digital still images of digital streaming media content,
and wherein each cropped version of the respective uncropped image is configured for display in at least one of promotional communication associated with the streaming media content, or electronic program control of the streaming media content.

17. A non-transitory computer-readable medium having instructions stored thereon that, when executed by one or more processors of a system configured for generating predicted cropping characteristics for input images, wherein cropping characteristics for any given input image comprise coordinates of cropping boundaries with respect to the any given input image prior to cropping, cause the system to carry out operations of a machine learning (ML) predictor program, wherein the operations include:
receiving one or more uncropped images;
applying the ML predictor program to the one or more uncropped images in order to generate for each respective uncropped image of the one or more uncropped images a respective set of runtime cropping characteristics, wherein the respective set of runtime cropping characteristics for each respective uncropped image comprises one or more subsets of cropping coordinates for the respective uncropped image, and wherein each subset corresponds to a different cropped version of the respective uncropped image; and
storing, in non-transitory computer-readable memory, the one or more uncropped images together with the respective set of runtime cropping characteristics for each respective uncropped image of the one or more uncropped images,
wherein, prior to receiving the one or more uncropped images, the ML predictor program has been trained to predict cropping characteristics for each respective training raw image of a plurality of training raw images, based on expected cropping characteristics represented in a respective set of training master images associated with the respective training raw image,
and wherein each training master image of the respective set of training master images indicates respective cropping characteristics defined for the associated respective training raw image.

18. The non-transitory computer-readable medium of claim 17, wherein the operations further include:
for each respective set of runtime cropping characteristics associated with each respective uncropped image, computing a predicted confidence level of each of the one or more subsets of cropping coordinates; and
storing, in the non-transitory computer-readable memory, the predicted confidence levels of the one or more subsets together with the respective set of runtime cropping characteristics for each respective uncropped image of the one or more uncropped images.

19. The non-transitory computer-readable medium of claim 17, wherein storing, in the non-transitory computer-readable memory, the one or more uncropped images together with the respective set of runtime cropping characteristics for each respective uncropped image of the one or more uncropped images comprises storing each respective uncropped image together with at least one of:
metadata corresponding to the respective set of runtime cropping characteristics, wherein the metadata are applicable to the respective uncropped image to create each different cropped version of the respective uncropped image; or
each different cropped version of the respective uncropped image generated by application of the set of runtime cropping characteristics to the respective uncropped image.

20. The non-transitory computer-readable medium of claim 17, wherein the ML predictor program comprises an artificial neural network (ANN),
and wherein applying the ML predictor program to the one or more uncropped images in order to generate for each respective uncropped image of the one or more uncropped images the respective set of runtime cropping characteristics comprises applying the ANN to the one or more uncropped images to predict the respective set of runtime cropping characteristics for each of the one or more uncropped images.

* * * * *